(12) United States Patent
Kuwajima et al.

(10) Patent No.: US 11,307,479 B2
(45) Date of Patent: Apr. 19, 2022

(54) SEMICONDUCTOR DEVICE

(71) Applicant: RENESAS ELECTRONICS CORPORATION, Tokyo (JP)

(72) Inventors: Teruhiro Kuwajima, Tokyo (JP); Yasutaka Nakashiba, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 97 days.

(21) Appl. No.: 16/829,509

(22) Filed: Mar. 25, 2020

(65) Prior Publication Data
US 2021/0302801 A1    Sep. 30, 2021

(51) Int. Cl.
*G02F 1/025* (2006.01)
*G02F 1/225* (2006.01)
*G02F 1/01* (2006.01)
*G02F 1/21* (2006.01)

(52) U.S. Cl.
CPC ............ *G02F 1/2257* (2013.01); *G02F 1/025* (2013.01); *G02F 1/212* (2021.01); *G02F 2202/105* (2013.01)

(58) Field of Classification Search
None
See application file for complete search history.

(56) References Cited

U.S. PATENT DOCUMENTS

| | | | |
|---|---|---|---|
| 11,002,997 B2* | 5/2021 | Namioka | G02F 1/025 |
| 11,079,540 B2* | 8/2021 | Watanuki | H01L 25/167 |
| 2016/0334573 A1* | 11/2016 | Kunishima | G02B 6/125 |
| 2019/0004342 A1* | 1/2019 | Iida | G02F 1/0147 |
| 2019/0018187 A1* | 1/2019 | Usami | G02B 6/12004 |
| 2021/0165160 A1* | 6/2021 | Iida | G02B 6/122 |
| 2021/0181545 A1* | 6/2021 | Kuo | G02F 1/2257 |

OTHER PUBLICATIONS

S. Tanaka et al. "Ultra-Low-Power (1.59 mW/Gbps), 56-Gbps PAM4 Operation of Si Photonic Transmitter Integrating Segmented PIN Mach-Zehnder Modulator and 28-nm CMOS Driver" 2017 European Conference on Optical Communication (ECOC).

\* cited by examiner

*Primary Examiner* — Michelle R Connelly
(74) *Attorney, Agent, or Firm* — McDermott Will & Emery LLP

(57) ABSTRACT

A semiconductor device includes a first insulating layer, an optical modulator, and a multilayer wiring layer. The optical modulator is formed on the first insulating layer. The multilayer wiring layer is formed on the first insulating layer and including a wiring and a resistive element which are spaced apart from each other. The resistive element is formed without overlapping with the optical modulator in plan view. A material of the resistive element is at least one selected from the group consisting of titanium, titanium nitride, tantalum, tantalum nitride, tungsten, and silicon chromium.

19 Claims, 27 Drawing Sheets

SEMICONDUCTOR DEVICE

BACKGROUND

It relates to a semiconductor device, for example, to a semiconductor device for treating an analogue signal.

There is a disclosed technique listed below.

[Non-Patent Document 1] S. Tanaka et al. "Ultra-Low-Power (1.59 mW/Gbps), 56-Gbps PAM4 Operation of Si Photonic Transmitter Integrating Segmented PIN Mach-Zehnder Modulator and 28-nm CMOS Driver" 2017 European Conference on Optical Communication (ECOC)

A semiconductor device including an equalizer circuit is known as a semiconductor device for treating an analogue signal (see, for example, Non-Patent Document 1). The equalizer circuit includes a resistive element and a capacitive element. A material of the resistive element described in Non-Patent Document 1 is n-type silicone. The capacitive element described in Non-Patent Document 1 includes a first wiring, an insulating layer, and a second wiring. The insulating layer is formed between the first wiring and the second wiring.

SUMMARY

In general, the resistance value of the resistive element increases as the temperature increases. In particular, the temperature dependence of the resistive element made of silicon is large. That is, the resistance value of the resistive element made of silicon varies depending on a temperature change. Thus, the conventional semiconductor device can be improved from the viewpoint of the characteristics of semiconductor device.

A problem of embodiments is improving of the characteristics of a semiconductor device. Other problems and novel features will become apparent from the description of the specification and drawings.

A semiconductor device according to embodiments includes a first insulating layer, an optical modulator formed on the first insulating layer, and a multilayer wiring layer formed on the first insulating layer such that the multilayer wiring layer covers the optical modulator. The multilayer wiring layer includes a wiring and a resistive element which are spaced apart from each other. The resistive element is formed without overlapping with the optical modulator in plan view. The resistive element is composed of at least one material selected from the group consisting of titanium, titanium nitride, tantalum, tantalum nitride, tungsten and silicon chromium.

According to the embodiments, the characteristics of the semiconductor device is improved.

DETAILED DESCRIPTION

Figure 1:
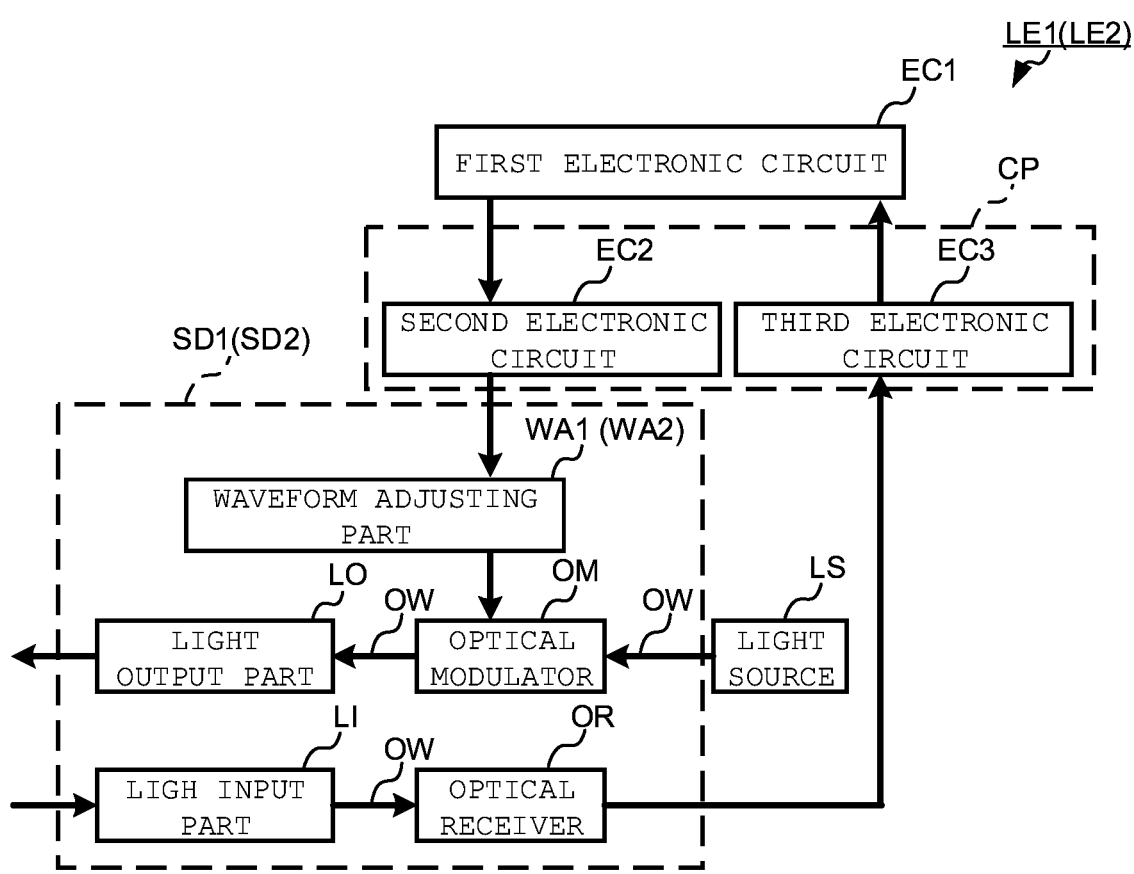
FIG. 1 is a block diagram showing an exemplary configuration of an optoelectronic hybrid device according to a first embodiment and a second embodiment.

Hereinafter, semiconductor devices according to embodiments and methods of manufacturing the semiconductor devices will be described in detail by referring to the drawings. In the specification and the drawings, the same or corresponding elements are denoted by the same reference numerals or the same hatching, and a repetitive description thereof is omitted. In the drawings, for convenience of description, the configuration may be omitted or simplified. A cross-sectional view may be shown as an end view.

First Embodiment

In a semiconductor device SD1 according to a first embodiment, a first resistive element R1 and a first capacitive element C1 constituting an equalizer circuit EQC1 are formed separately.

(Circuit Configuration of Optoelectronic Hybrid Device)

Figure 2:
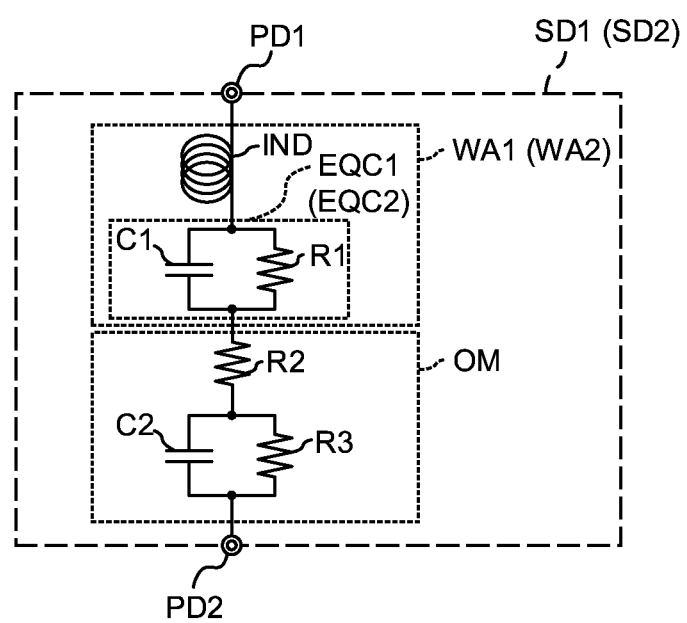
FIG. 2 is a circuit diagram showing an exemplary circuit configuration of a main portion of the optoelectronic hybrid device according to the first embodiment and the second embodiment.

FIG. 1 is a block diagram showing an exemplary configuration of an optoelectronic hybrid device LE1 according to the first embodiment. FIG. 2 is a circuit diagram showing an exemplary circuit configuration of a main portion of the optoelectronic hybrid device LE1.

As shown in FIG. 1, the optoelectronic hybrid device LE1 includes a first electronic circuit, a light source LS, an IC chip CP, and a semiconductor device SD1. The IC chip CP includes a second electronic circuit EC2 and a third electronic circuit EC3. As shown in FIG. 1 or FIG. 2, the semiconductor device SD1 includes an optical waveguide OW, a wave adjusting part WA1, an optical modulator OM, a light output part LO, a light input part LI, and an optical receiver OR. The configuration of the semiconductor device SD1 will be described in detail later.

The first electronic circuit EC1 outputs an electrical signal (control signal) for controlling the second electronic circuit EC2. The first electronic circuit EC1 receives an electrical signal outputted from the third electronic circuit EC3. The first electronic circuit EC1 is electrically coupled with the second electronic circuit EC2 and the third electronic circuit EC3. The first electronic circuit EC1 is formed of, for example, a known CPU (Central Processing Unit) or FPGA (Field-Programmable gate array) which include a control circuit and a storage circuit.

The light source LS emits light. Examples of types of the light source LS include laser diode. A wavelength of a light emitted from the light source LS may be set as appropriate in accordance with a material constituting the optical waveguide OW as long as the emitted light can pass through an inside of the optical waveguide OW. For example, a peak wavelength of the light emitted from the light source LS is 1.0 μm or more and 1.6 μm or less. The light source LS is optically connected with the optical modulator OM through the optical waveguide OW.

The second electronic circuit EC2 outputs an electrical signal (control signal) for controlling the operation of the optical modulator OM. More specifically, the second electronic circuit EC2 controls the optical modulator OM based on the control signal received from the first electronic circuit EC1. The second electronic circuit EC2 is electrically coupled with the optical modulator OM. The second electronic circuit EC2 is constituted by, for example, a known transceiver IC including a control circuit.

The waveform adjusting part WA1 adjusts a waveform of electrical signal received from the second electronic circuit EC2, and outputs an electrical signal toward the optical modulator OM. In the first embodiment, the waveform adjusting part WA1 includes an inductor IND and an equalizer circuit EQC1. As will be described in detail later, the inductor IND and the equalizer circuit EQC1 are electrically connected with each other.

IND is electrically connected with the second EC2. The inductor IND provides so-called peaking to an electrical signal from the second electronic circuit EC2. In other words, the inductor IND adjusts the waveform of an electrical signal so that the transition time (rise time and fall time) of the electrical signal becomes smaller. The transition time is, for example, a time required to transition from a first state to a second state. The first state is, for example, one of an OFF state and an ON state. The second state is, for example, the other of the OFF state and the ON state.

The equalizer circuit EQC1 corrects an electrical signal that has changed in a process of being transmitted from the second electronic circuit EC2. In first embodiment, the equalizer circuit EQC1 corrects the waveform of the electrical signal adjusted by the inductor IND.

The optical modulator OM modulates the phase of the light emitted from the light source LS based on an electrical signal from the wave adjusting part WA1. The optical modulator OM generates an optical signal including information included in the electrical signal. The type of the optical modulator OM is a Mach-Zehnder type optical modulator. The optical modulator OM may be an electrically controlled optical modulator, or a combination-type optical modulator using a combination of electrical control and thermal control. In first embodiment, the optical modulator OM is the combination-type optical modulator described above. The optical modulator OM is optically connected with the light output part LO through the optical waveguide OW.

The light output part LO outputs the optical signal modulated by the optical modulator OM toward the outside of the semiconductor device SD1. For example, the light output part LO emits an optical signal toward an external optical fiber. Examples of the type of the light output part LO include a GC (grating coupler) and an SSC (spot size converter).

The light input part LI inputs external light into the semiconductor device SD1. For example, an optical signal emitted from an external optical fiber is inputted into the semiconductor device SD1. Examples of the type of light input part LI include a GC (grating coupler) and an SSC (spot size converter). The light input part LI is optically connected with the optical receiver OR through the optical waveguide OW.

The optical receiver OR generates electron-hole pairs based on the optical signal received from the light input part LI. The optical receiver OR converts an optical signal into an electrical signal. The optical receiver OR may have photoelectric conversion characteristics. Examples of the type of the optical receiver OR include an avalanche-photodiode-type optical receiver. The optical receiver OR is electrically coupled with the third electronic circuit EC3.

The third electronic circuit EC3 processes the electrical signal received from the optical receiver OR and outputs the processed electrical signal to the first electronic circuit EC1. More specifically, the third electronic circuit EC3 amplifies the electrical signal received from the optical receiver OR and outputs the amplified electrical signal toward the first electronic circuit EC1. The third electronic circuit EC3 is constituted by, for example, a known receiver IC including an amplifier circuit.

Next, examples of the circuit configuration of a main portion of the optoelectronic hybrid device LE1 will be described. In FIG. 2, among the elements of the semiconductor device SD1, the waveform adjusting part WA1 and the optical modulator OM are shown.

The waveform adjusting part WA1 according to the first embodiment includes the inductor IND and the equalizer circuit EQC1. As shown in FIG. 2, the wave adjusting part WA1 is connected between a first pad PD1 and a second pad PD2.

The inductor IND is connected between the first pad PD1 and the second pad PD2. In the first embodiment, the inductor IND is connected between the first pad PD1 and the equalizer circuit EQC1.

The equalizer circuit EQC1 is connected between the first pad PD1 and the second pad PD2. In first embodiment, equalizer circuit EQC1 is connected between the inductor IND and the optical modulator OM.

The equalizer circuit EQC1 includes a first resistive element R1 and a first capacitive element C1. As shown in FIG. 2, the first resistive element R1 and the first capacitive element C1 are electrically connected in common with the optical modulator OM. The first resistive element R1 and the first capacitive element C1 are electrically connected in common with the inductor IND.

The first resistive element R1 is connected in parallel with the first capacitive element C1 between the inductor IND and the optical modulator OM. The resistance value of the first resistive element R1 is appropriately adjusted in accordance with desired characteristics of the equalizer circuit EQC1. Assume, for example, that the capacitance value of the optical modulator OM is 3.9 pF and the resistance value of the optical modulator OM is 700Ω. When the frequency of an electrical signal handled by the semiconductor device SD1 is 100 GHz or more, the resistance value of the first resistive element R1 is preferably 85 kΩ or more. If the resistance value of the first resistive element R1 is less than 85 kΩ, the semiconductor device SD1 may not be able to treat the high-frequency electrical signal properly.

The capacitance value of the first capacitive element C1 is appropriately adjusted in accordance with desired characteristics of the equalizer circuit EQC1. Assume, for example, that the capacitance value of the optical modulator OM is 3.9 pF and the resistivity value of the optical modulator OM is 700Ω. When the electrical signal frequency treated by the semiconductor device SD1 is 100 GHz or more, the capacitance value of the first capacitive element C1 is preferably 35 fF or less. If the capacitance value of the first capacitive element C1 is greater than 35 fF, the semiconductor device SD1 may not be able to treat the high-frequency electrical signal properly.

In the first embodiment, the optical modulator OM includes: a second resistive element R2; a third resistive element R3; and a second capacitive element C2. Third resistive element R3 is connected in parallel with the second capacitive element C2 between the second pad PD2 and the second resistive element R2. The resistance value of the second resistive element R2 is not particularly limited, and is, for example, 50Ω. The resistance value of the third resistive element R3 is not particularly limited, and is, for example, 700Ω. The capacitance value of the second capacitor C2 is not particularly limited, and is, for example, 3.9 pF.

Next, an exemplary operation of the optoelectronic hybrid device LE1 according to the first embodiment will be described.

First, the transmission part of the optoelectronic hybrid device LE1 will be described. A light emitted from the light source LS reaches the optical modulator OM through the optical waveguide OW. The second electronic circuit EC2 outputs an electrical signal for controlling the operation of the optical modulator OM toward the waveform adjusting part WA1 based on the control signal received from the first electronic circuit EC1. In the wave adjusting part WA1, the electrical signal is peaked by the inductor IND. A waveform of the peaked electrical signal is adjusted in the equalizer circuit EQC1. The optical modulator OM then modulates the light passing through the optical modulator OM based on the received electrical signal. As a result, the electrical signal is converted into an optical signal. The optical signal reaches the light output part LO through the optical waveguide OW, and the optical signal is output to the outside of the semiconductor device SD1 in the light output part LO. The optical signal emitted from the semiconductor device SD1 is guided to another optoelectronic hybrid device through an optical fiber or the like.

Next, the receiving part of the optoelectronic hybrid device LE1 will be described. An optical signal guided from another optoelectronic hybrid device through an optical fiber or the like reach the light input part LI. The optical signal is guided to the inside of the optical waveguide OW in the light input part LI. The optical signal reaches the optical receiver OR through the optical waveguide OW, and is converted into an electrical signal. The electrical signal is processed by the third electronic circuit EC3 and then transmitted toward the first electronic circuit EC1.

(Configuration of Semiconductor Device)

Figure 3:
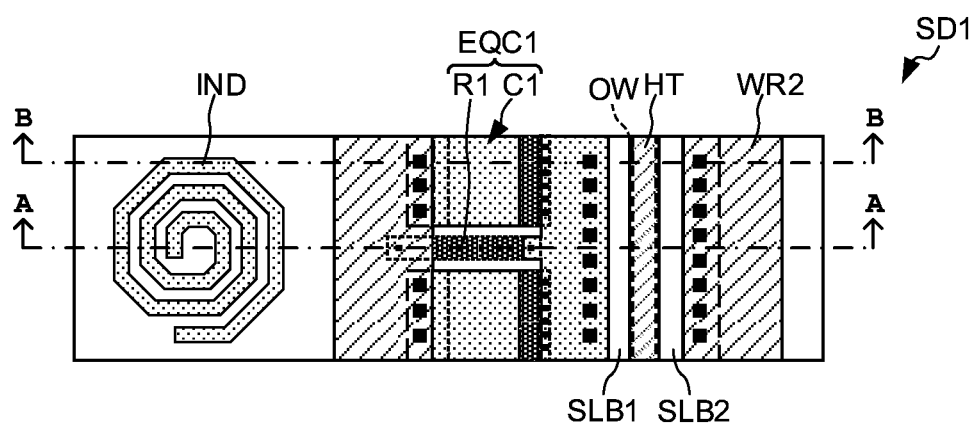
FIG. 3 is a plan view showing an exemplary configuration of a main portion of a semiconductor device according to the first embodiment.
Figure 4:
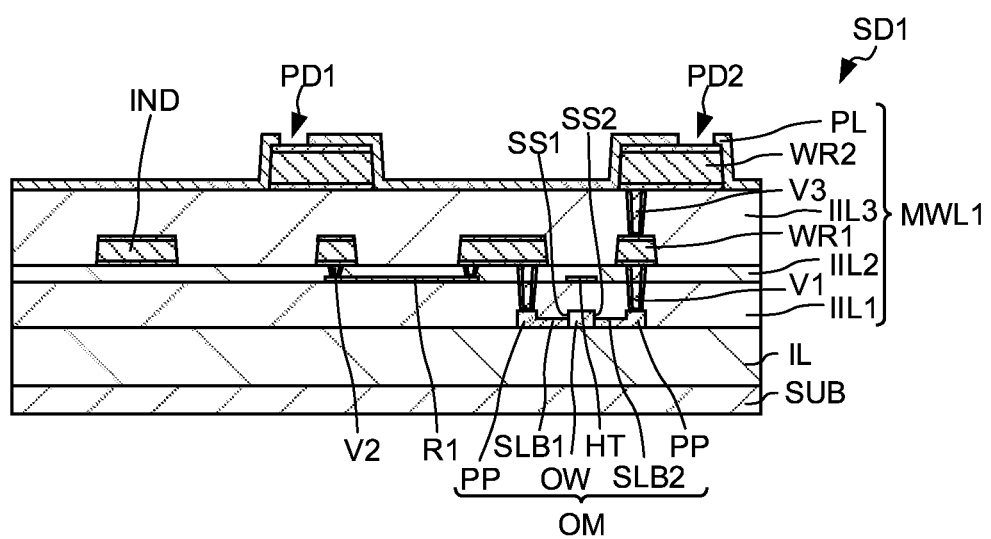
FIG. 4 is a cross-sectional view showing an exemplary configuration of the main portion of a semiconductor device according to the first embodiment.
Figure 5:
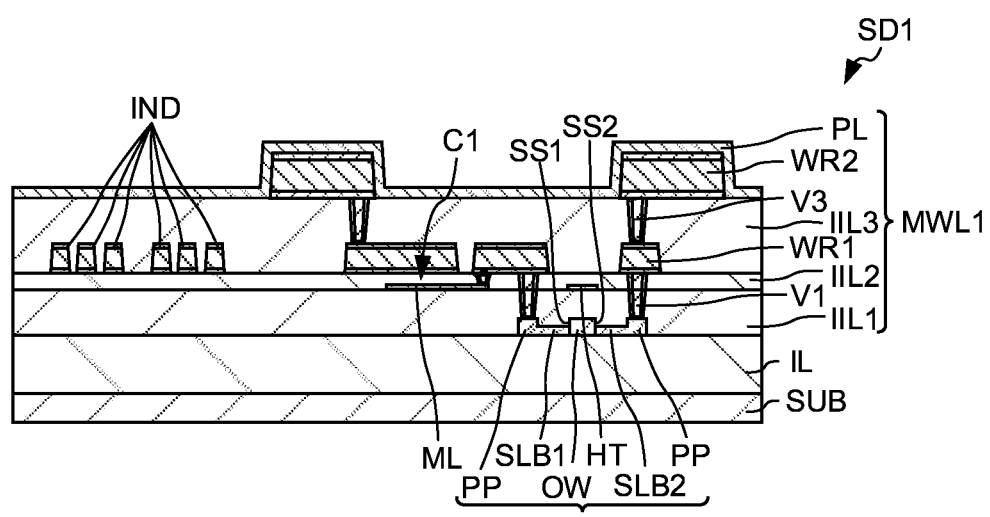
FIG. 5 is a cross-sectional view showing an exemplary configuration of the main portion of the semiconductor device according to the first embodiment.

Next, the configuration of the semiconductor device SD1 according to the first embodiment will be described. FIG. 3 is a plan view showing an exemplary configuration of a main portion of the semiconductor device SD1. FIG. 4 and FIG. 5 are cross-sectional views showing exemplary configuration of the main portion of the semiconductor device SD1. FIG. 4 is a cross-sectional view taken along line A-A of FIG. 3. FIG. 5 is a cross-sectional view taken along line B-B of FIG. 3.

The semiconductor device SD 1 includes a substrate SUB, an insulating layer IL, an optical modulator OM and a multilayer wiring layer MWL1. The multilayer wiring layer MWL1 includes a first interlayer insulating layer IIL1, a first resistive element R1, a metallic layer ML, a second interlayer insulating layer IIL2, a first via V1, a second via V2, a first wiring WR1, an inductor IND, a third interlayer insulating layer IIL3, a third via V3, a second wiring WR 2, and a protective layer PL.

The substrate SUB supports the optical modulator OM through the insulating layer IL. Examples of types of the substrate SUB include silicone substrate. The silicon substrate is, for example, a silicon single-crystal substrate containing impurities such as boron (B) and phosphorus (P). For example, the plane orientation of a main surface of the silicon substrate is (100), and the resistivity of the silicon substrate is 5 Ω·cm or more and 50 Ω·cm or less. A thickness of the substrate SUB is, for example, 100 μm or more and 900 μm or less.

The insulating layer IL is formed on the substrate SUB. The insulating layer IL is a cladding layer for substantially confining the light propagating inside the optical modulator OM (optical waveguide OW) to the inside of the optical modulator OM (optical waveguide OW). A material of the insulating layer IL has a refractive index smaller than a refractive index of a material of the optical modulator OM. Examples of materials of the insulating layer IL include silicon oxide (SiO2). The refractive index of the materials of insulating layer ILs is, for example, 1.46. In this specification, the refractive index is a numerical value for light having a wavelength of 1.5 μm.

It is preferable that the thickness of the insulating layer IL is greater than a light seepage distance from the optical modulator OM. From a viewpoint of reducing stresses caused by the insulating layer IL and from a viewpoint of suppressing sticking of the substrate SUB by electrostatic chucks during manufacturing of the semiconductor device SD1, the thickness of the insulating layer IL is preferable small. For example, the thickness of the insulating layer IL is preferably 2 μm or more and 3 μm or less.

When the insulating layer IL functions as a support member, the semiconductor device SD1 may not include the substrate SUB. In this instance, the insulating layer IL is, for example, a sapphire substrate.

The optical modulator OM is configured to operate based on an electrical signal having a frequency of 100 GHz or more, for example. The optical modulator OM according to the first embodiment is a Mach-Zehnder type optical modulator. That is, the optical waveguide OW constituting the optical modulator OM includes an optical waveguide for input, a pair of optical waveguides branched from the optical waveguide for input, and an optical waveguide for output. The pair of optical waveguides is positioned between the optical waveguide for input and the optical waveguide for output. In FIGS. 3 to 5, one of a pair of optical waveguides is shown.

The optical modulator OM includes the optical waveguide OW, a first slab portion SLB1 including a protruding portion PP, a second slab portion SLB2 including a protruding portion PP, and a heater HT. The optical modulator OM is configured to modulate the phase of the light propagating through the inside of the optical waveguide OW.

The optical waveguide OW is a linear path configured to allow light to propagate inside the optical waveguide OW. The optical waveguide OW is a portion of the optical modulator OM. The optical waveguide OW includes an upper surface and a lower surface located on opposite sides in the optical waveguide OW, and a first side surface SS1 and a second side surface SS2 located on opposite sides in the optical waveguide OW. The optical waveguide OW is formed on the insulating layer IL. The optical waveguide OW is directly or indirectly covered with the insulating layer IL and the first interlayer insulating layer IIL1. In first embodiment, the first side surfaces SS1 and the second of the optical waveguide OW and the upper surface of the optical waveguide OW are directly contacted with the first interlayer insulating layer IIL1. The lower surface of the optical waveguide OW is directly contacted with the insulating layer IL.

As described above, the optical waveguide OW is covered with the insulating layer IL and the first interlayer insulating layer IIL1 which have a refractive index smaller than a refractive index of the material of the optical waveguide OW. Thus, the light can travel inside the optical waveguide OW while being substantially confined inside the optical waveguide OW. However, the light travels inside the optical waveguide OW while seeping out to the outside of the optical waveguide OW by the wavelength order of the light.

The cross-sectional shape of the optical waveguide OW in the cross-section orthogonal to an extending direction of the optical waveguide OW may be any shape as long as light can propagate inside the optical waveguide OW. Examples of the cross-sectional shape of the optical waveguide OW include a rectangular shape and a trapezoidal shape. In present embodiment, the cross-sectional shape of the optical waveguide OW is a rectangular shape.

A width and a height (thickness) of the optical waveguide OW may be any size as long as the optical waveguide OW can appropriately propagate inside the optical waveguide OW. The width and the height of the optical waveguide OW can be appropriately set in accordance with conditions such as a wavelength of light passing through the inside of the optical waveguide OW and a mode of the light. The width of the optical waveguide OW is, for example, 300 nm or more and 500 nm or less. The height of the optical waveguide OW is, for example, 200 nm or more and 300 nm or less.

The width of the optical waveguide OW is an distance between the first side surface SS1 and the second side surface SS2, and is an distance between the optical waveguides OW in the facing direction (width direction of the optical waveguide OW) of the first side surface SS1 and second side surface SS2. The height of the optical waveguide OW is a distance between the lower surface of the optical waveguide OW and the upper surface of the optical waveguide OW in the facing direction of the upper surface and the lower surface of the optical waveguide OW. In present embodiment, the height of the optical waveguide OW is a distance between an upper surface of the insulating layer IL and the upper surface of the optical waveguide OW in the facing direction of the upper surface and the lower surface of the optical waveguide OW.

The material of the optical waveguide OW is a semiconductor material transparent to light passing through the inside of the optical waveguide OW. Examples of the material for the optical waveguide OW include silicon and germanium. The crystal structure of the material of optical waveguide OW may be single crystal or polycrystalline. The refractive index of the material of the optical waveguide OW is, for example, 3.5.

The first slab portion SLB1 is formed on the insulating layer IL such that the first slab portion SLB1 is adjacent to the first side surface SS1 of the optical waveguide OW in the width direction of the optical waveguide OW. The first slab portion SLB1 is integrally formed with the optical waveguide OW as a single member. The height (thickness) of the first slab portion SLB1 is preferably smaller than the height (thickness) of the optical waveguide OW from a viewpoint of appropriately confining light inside the optical waveguide OW. The height of the first slab SLB1 is preferably about 100 nm.

The first slab portion SLB1 preferably includes protruding portion PP. Thus, the height of a via on the first slab portion SLB1 can be adjusted. The protruding portion PP is integrally formed with the first slab portion SLB1 as a single member. It is preferable that thickness of the protruding portion PP is about the same as the height of the optical waveguide OW. The thickness of the protruding portion PP is the distance between the upper surface of the insulating layer IL and the upper surface of the protruding portion PP in the facing direction of the upper surface and the lower surface of the optical waveguide OW.

The first slab portion SLB1 is semiconductor layer having a first conductivity type. The first conductivity type may be an n-type or a p-type. When the first conductivity type is n-type, the first slab portion SLB1 contains n-type impurities such as arsenic (As) and phosphorus (P). When the first conductivity type is p-type, the first slab portion SLB1 contains p-type impurities such as boron (B) and boron difluoride (BF2). An impurity concentration of the first slab portion SLB1 is, for example, $1\times10^{17}$ cm-3 or more.

From a viewpoint of suppressing the voltage drop in the first slab portion SLB1 and from a viewpoint of forming an ohmic junction between the first via V1 and the first slab portion SLB1, it is preferable that the impurity concentration of a portion of the first slab portion SLB1 that contacts the first via V1 be greater than the impurity concentration of another portion of the first slab portion SLB1. Among the first slab portion SLB1, the impurity concentration of the portion contacting the first via V1 (protruding portion PP), for example, $1\times10^{19}$ cm-3 or more.

The configuration of the second slab portion SLB2 is the same as the configuration of the first slab portion SLB1 except for the conductivity type, and therefore the explanation thereof is omitted.

The heater HT is configured to supply heat toward the optical waveguide OW. As a result, the heater HT can change the phase of the light traveling in the optical waveguide OW. The heater HT is formed in the vicinity of the optical waveguide OW. In first embodiment, the heater HT is formed on the second interlayer insulating layer IIL2 such that the heater HT overlaps with the optical waveguide OW in plan view. The heater HT is separated from the optical waveguide OW in the height direction of the optical waveguide OW.

The shape, size, number, and material of the heater HT are not particularly limited as long as the above-mentioned function can be obtained. The heater HT preferably extends along the optical waveguide OW in plan view. As a result, the heater HT can efficiently supply heat toward the optical waveguide OW. A width of the heater HT may be the same as the width of the optical waveguide OW, may be greater than the width of the optical waveguide OW, or may be smaller than the width of the optical waveguide OW in plan view. In the first embodiment, the width of the heater HT is approximately the same as the width of the optical waveguide OW. The number of the heater sections HT is one or more. In the first embodiment, the number of heaters HT is one. Examples of materials for the heater HT include titanium (Ti), titanium nitride (TiN), tantalum (Ta), tantalum nitride (TaN), and tungsten (W). The heater HT may be a single layer film or a stacked film of two or more layers. The stacked film includes two or more films formed of different materials.

The multilayer wiring layer MWL 1 is formed on the insulating layer IL such that the multilayer wiring layer MWL covers the optical modulator OM. The multilayer wiring layer MWL1 is a layer composed of two or more wiring layers. The wiring layer is a layer including an interlayer insulating layer and one or both of a wiring and a via that are formed in the interlayer insulating layer. The via is a conductive member electrically connecting two wiring formed in layers that differ from each other. In the first embodiment, "wiring" is a metallic layer configured to be capable of transmitting an electrical signal. For example, wiring is aluminum wiring formed using aluminum as a main component, or copper wiring formed using copper as a main component.

The multilayer wiring layer MWL1 includes the first interlayer insulating layer IIL1, the first resistive element R1, the metallic layer ML, the second interlayer insulating layer IIL2, the first via V1, the second via V2, the first wiring, the inductor IND, the third interlayer insulating layer IIL3, the third via V3, the second WR 2, and the protective layer PL. The heater HT described above is formed in the multilayer wiring layer MWL1. The metallic layer ML, a portion of second interlayer insulating layer IIL2, and a portion of the first wiring WR1 constitute the first capacitive element C1. The first resistive element R1 and the first capacitive element C1 constitute the equalizer circuit EQC1.

The first interlayer insulating layer IIL1 is formed on insulating layer IL such that the first interlayer insulating layer IIL1 covers the optical modulator OM. The first interlayer insulating layer IIL1 is directly contacted with the upper surface, the first side surface SS1 and the second side surface SS2 of the optical waveguide OW. The first interlayer insulating layer IIL1 is composed of a material having a refractive index smaller than a refractive index of the material of the optical waveguide OW. Examples of materials for the first interlayer insulating layer IIL1 include silicon oxide (SiO2). The refractive index of the first interlayer insulating layer IIL1 is, for example, 1.46. The thickness of the first interlayer insulating layer IIL1 is preferably 0.5 μm or more from the viewpoint of suppressing scattering of light seeping out of the optical waveguide OW by the first wiring WR1 formed on the first interlayer insulating layer IIL1. In addition, from a viewpoint of ease of manufacturing process, the thickness of the first interlayer insulating layer IIL1 is preferably 1.0 μm or less.

As shown in FIG. 4, the first resistive element R1 is formed on the first interlayer insulating layer IIL1. The first resistive element R1 is electrically connected with the optical modulator OM. In first embodiment, the first resistive element R1 is electrically connected with the optical modulator OM through the first via V1, the first wiring WR1, and the second via V2.

The first resistive element R1 is formed at a position different from the optical modulator OM in plan view. The first resistive element R1 is formed without overlapping with the optical modulator OM in plan view. The first resistive element R1 is spaced apart from the first wiring WR1. An insulating film is interposed between the first resistive element R1 and the first wiring WR1. The first resistive element R1 may be formed in a same layer as a layer in which at least one of the heater HT and the metallic layer ML are formed, or may be formed in a layer different from at least one of the heater HT and the metal layer ML. The first resistive element R1 is preferably formed in the same layer as the layer in which at least one of the heater HT and the metallic layer ML are formed. As a result, the first resistive element R1 can be formed in a step common to at least one of a step of forming the heater HT and a step of forming the metallic layer ML. As a result, the number of steps for manufacturing the semiconductor device SD1 can be reduced.

Here, "a same layer" means directly covered by an interlayer insulating layer shared by each other. In the first embodiment, the first resistive elements R1, the heater HT, and the metallic layer ML are all directly covered with the second interlayer insulating layer IIL2. That is, the first resistive element R1 is formed in the same layer as the heater HT and the metallic layer ML.

An end portion of the first resistive element R1 is electrically connected with the optical modulator OM and the metallic layer ML. Another end portion of the first resistive element R1 is electrically connected with the first wiring WR1. In the first embodiment, the first resistive element R1 is connected between a lower electrode (the metallic layer ML) of the first capacitive element C1 and an upper electrode (the portion of the first wiring WR1) of the first capacitive element C1.

The shape and thickness of the first resistive element R1 are appropriately adjusted in accordance with a desired resistance value. As shown in FIG. 3, the shape of the first resistive element R1 in plan view is, for example, a rectangular shape. The first resistive element R1 may include a bent portion or may not include a bent portion in plan view. From the viewpoint of increasing the resistance value of the first resistive element R1, the thickness of the first resistive element R1 is preferably small. In the first embodiment, the thickness of the first resistive element R1 is smaller than the thickness of the first wiring WR1. The thickness of the first resistive element R1 is, for example, 5 nm or more and 200 nm or less.

The thickness of the first resistive element R1 may be a same as or may be different from at least one of the thickness of the heater HT and the thickness of the metallic layer ML. The thickness of the first resistive element R1 is preferably the same as at least one of the thickness of the heater HT and the thickness of the metallic layer ML. As a result, the first resistive element R1 can be formed in a step common to at least one of a step of forming the heater portion HT and a step of forming the metallic layer ML. As a result, the number of steps for manufacturing the semiconductor device SD1 can be reduced.

The material of the first resistive element R1 is preferably a metallic having a resistance value greater than the resistance value of the material of the first wiring WR1. The material of the first resistive element R1 may be a same as or may be different from the material of the heater HT. From the viewpoint of ease of manufacturing the semiconductor device SD1, it is preferable that the material of the first resistive element R1 is the same as the material of the heater HT and the metallic layer ML. The first resistive elements R1, the heater HT and the metallic layer ML can be formed in a same step, and the number of steps for manufacturing the semiconductor device SD1 can be reduced.

The first resistive element R1 has one or both of a sheet resistance smaller than a sheet resistance (900 to 1800Ω/□) of a resistive element composed of silicon and a resistance temperature coefficient (absolute value) smaller than a resistance temperature coefficient (2100 to 5600 ppm/° C.) of the resistive element composed of silicon. If the sheet resistance of the first resistive element R1 is smaller than the sheet resistance of the resistive element composed of silicon, the resistance temperature coefficient of the first resistive element R1 may be greater than the resistance temperature coefficient of the resistive element composed of silicon. In this case, if the sheet resistance of the first resistive element R1 is small, the amount of variation in the characteristics of the first resistive element R1 is also substantially small. The material of the first resistive element R1 is at least one material selected from the group consisting of titanium (sheet resistance: 5 to 60Ω/□, resistance temperature coefficient: 3500 to 3600 ppm/° C.), titanium nitride (sheet resistance: 37 to 41Ω/□, resistance temperature coefficient: 400 ppm/° C.), tantalum (sheet resistance: 1 to 10Ω/□, resistance temperature coefficient: 3600 to 3700 ppm/° C.), tantalum nitride (sheet resistance: 10 to 200Ω/□, resistance temperature coefficient: −150 to −100 ppm/° C.), tungsten (sheet resistance: 0.54Ω/° C., resistance temperature coefficient: 1600 to 2300 ppm/° C.), and silicon chromium (sheet resistance: 300 to 1300Ω/° C., resistance temperature coefficient: −200 to −100 ppm/° C.).

From the viewpoint of compatibility between a high resistance value and low temperature dependency, it is preferable that the first resistive element R1 has a sheet resistance smaller than the sheet resistance (900 to 1800Ω/□) of the resistive element composed of silicon, and has a resistance temperature coefficient smaller than the resistance temperature coefficient (2100 to 5600 ppm/° C.) of the resistive element composed of silicon. From this viewpoint, the material of the first resistive element R1 is preferably at least one selected from the group consisting of titanium nitride (sheet resistance: 37 to 41Ω/□, resistance temperature coefficient: 400 ppm/° C.), tantalum nitride (sheet resistance: 10 to 200Ω/□, resistance temperature coefficient: −150 to −100 ppm/° C.), and silicon chromium (sheet resistance: 300 to 1300Ω/° C., resistance temperature coefficient: −200 to −100 ppm/° C.). The sheet resistance of each material is a value when the thickness of the first resistive element R1 is 15 to 150 nm.

Although details will be described later, in the first resistive element R1, silicon (Si, sheet resistance: 900 to 1800Ω/□, resistance temperature coefficient: 2100 to 5600 ppm/° C.) is removed as the material of the first resistive element R1 from the viewpoint of compatibility between a high resistance value and a low temperature dependence. The first resistive element R1 may be a single-layer film or a stacked film of two or more layers. The stacked film includes two or more films formed of different materials. For example, an example of the first resistive element R1 formed of a stacked film includes a titanium/titanium nitride stacked film and a tantalum/tantalum nitride stacked film. The sheet resistance and the resistance temperature coefficient are examples, and may vary depending on the composition of the material.

Here, the resistance value of the first resistive element R1 and the resistance value of the first wiring WR1 are estimated based on the material and the size of the first resistive element R1 and the material and the size of the first wiring WR1.

As shown in FIG. 4, the metallic layer ML is formed on the first interlayer insulating layer IIL1. The metallic layer ML is formed at a position different from the optical modulator OM in plan view. The metal layer ML is electrically connected with the optical modulator OM. In the first embodiment, the metallic layer ML is electrically connected with the optical modulator OM through the first via V1, the first wiring via WR1, and the second via V2.

The metallic layer ML is a second electrode (in the first embodiment, a lower electrode) of the first capacitive element C1. The size of the metallic layer ML is not particularly limited as long as it can function as the lower electrode of the first capacitive element C1. In plan view, the size of the metal layer ML is appropriately adjusted in accordance with a desired capacitance value of the first capacitive element C1. The material of the metallic layer ML is also a metal having a resistance value greater than the resistance value of the material of the first wiring WR1. An example of the material of the metallic layer ML is a same as the example of the material of the first resistive element R1. The metallic layer ML may be a single layer film or a stacked film of two or more layers. The stacked film has two or more films formed of different materials.

The second interlayer insulating layer IIL2 is formed on the first interlayer insulating layer IIL1 such that the second interlayer insulating layer IIL2 covers the first resistive element R1, the metallic layer ML, and the heater HT. Examples of materials for the second interlayer insulating layer IIL2 are similar to those for the first interlayer insulating layer IIL1.

A portion of the second interlayer insulating layer IIL2 is a dielectric film of the first capacitive element C1. As shown in FIG. 5, the portion of the second interlayer insulating layer IIL2 is formed between the metallic layer ML and the first wiring WR1. The portion of the second interlayer insulating layer IIL2 is sandwiched between the metallic layer ML and the first wiring WR1.

A thickness of the second interlayer insulating layer IIL2 is preferably large from the viewpoint of suppressing the light seeping out of the optical waveguide OW from being scattered by the first wiring WR1. For example, the thickness of the second interlayer insulating layer IIL2 is preferable 0.2 µm or more. From the viewpoint of increasing the capacitance value of the first capacitive element C1, the thickness of the second interlayer insulating layer IIL2 is preferably small. The thickness of the second interlayer insulating layer IIL2 is preferably smaller than the thickness of the first interlayer insulating layer IIL1 and the thickness of the third interlayer insulating layer IIL3. For example, the thickness of the second interlayer insulating layer IIL2 is preferable 1.0 µm or less.

From the viewpoint of suppressing the light scattering by the first wiring WR1, the sum of the thicknesses of the first interlayer insulating layer IIL1 and the second interlayer insulating layer IIL2 is preferably 1.0 µm or more. As described above, from the viewpoint of ease of manufacturing step, the sum of the thicknesses of the first interlayer insulating layer IIL1 and the second interlayer insulating layer IIL2 is preferably 2 µm or less.

The first via V1 is formed in the first interlayer insulating layer IIL1 and the second interlayer insulating layer IIL2 such that the first via V1 reaches the first slab portion SLB1 or the second slab portion SLB2. In the first embodiment, the two first vias V1 electrically connect the first slab portion SLB1 with the first wiring WR1 and the second slab portion SLB2 with the first WR1, respectively. As the configuration of the first via V1, a known configuration adopted as a via in the semiconductor technology can be adopted. The first via V1 includes, for example, a barrier film and a conductive film formed on the barrier film. Examples of materials of the barrier film include titanium (Ti) and titanium nitride (TiN). The material of the conductive film is, for example, tungsten (W), aluminum (Al), or copper (Cu).

The second via V2 electrically connects the first resistive element R1 and the first wiring element WR1 with each other in the second interlayer insulating layer IIL2. An example of the configuration of the second via V2 is a same as the configuration of the first via V1.

The first wiring WR1 is formed on the secondary interlayer insulating layer IIL2. A portion of the first wiring WR1 is a first electrode (in the first embodiment, an upper electrode) of the first capacitive element C1. As shown in FIG. 3, the portion of the first wiring WR1 is formed such that the portion of the first wiring WR1 overlaps with a portion of the metallic layer ML in plan view. The portion of the first wiring WR1 is formed without overlapping with the first resistive element R1 in plan view.

The first wiring WR1 is electrically connected with the optical modulator OM through the first via V1. The first wiring WR1 is electrically connected with the first resistive element R1 through the second via V2. For the first wiring WR1, a known structure employed as a wiring in the semiconductor technology can be employed. An example of the first wiring WR1 is, for example, a stacked film in which a barrier film, a conductive film, and a barrier film are laminated in this order. Examples of materials for the barrier film include titanium (Ti) and titanium nitride (TiN). Examples of materials for the conductive film include aluminum and copper. In present embodiment, the first wiring WR1 is aluminum wiring.

Here, the first wiring WR1 is a wiring directly connected with the optical modulator OM through the first via V1 in the multilayer wiring layer MWL1. That is, in plan view, there is no wiring composed of a same materials as a material of the first wiring WR1 between the first wiring WR1 and the first optical modulator OM.

The inductor IND is formed in the multilayer wiring layer MWL1. In the first embodiment, the inductor IND is formed on the second interlayer insulating layer IIL2. The inductor IND is electrically connected with the equalizer circuit EQC1. In other words, the inductor IND is commonly connected with the first resistive element R1 and the capacitive element C1. The inductor IND is electrically connected between the first pad PD1 and the equalizer circuit EQC1.

The size, shape, and number of turns of the inductor IND are not particularly limited as long as desired characteristics can be obtained. Examples of the shape of the inductor IND include a substantially rectangular shape, a substantially octagonal shape, and a substantially circular shape. The number of turns of the inductor IND is one or more.

The third interlayer insulating layer IIL3 is formed on the second interlayer insulating layer IIL2 such that the third interlayer insulating layer IIL3 covers the first wiring WR1 and the inductor IND. Examples of materials for the third interlayer insulating layer IIL3 are similar to those for the first interlayer insulating layer IIL1.

The third via V3 electrically connects the first wiring WR1 and second wiring WR2 with each other in the third interlayer insulating layer IIL3. An example of the configuration of the third via V3 is a same as the configuration of the first via V1.

The second wiring WR2 is formed on the third interlayer insulating layer IIL3. In the first embodiment, the second wiring WR2 is the top layer wiring of the multilayer wiring layer MWL1. Examples of the configuration of the second wiring WR2 are a same as those of the first wiring WR1.

The second wiring WR2 includes a first pad PD1 and a second pad PD2. The first pad PD1 and the second pad PD2 are portions of the second wiring WR2 that are electrically connected with an external circuit.

The first pad PD1 and the second pad PD2 are portions of the second wiring WR2 exposed from the protective layer PL of the multilayer wiring layer MWL1. The first pad PD1 and the second pad PD2 are configured to be electrically connected with an external circuit by wire bonding connection or flip-chip connection. From the viewpoint of suppressing damage that may occur to optical modulator OM when bonding, it is preferable that the first pad PD1 and the second pad PD2 are formed without overlapping with at least one selected from the group consisting of the optical modulator OM, the inductor IND, and the equalizer circuit EQC1 in plan view.

The protective layer PL is a layer for protecting the semiconductor device SD1 from an external moisture and the like. The protective layer PL is formed on the third interlayer insulating layer IIL3. In the protective layer PL, an opening is formed at positions corresponding to the first pad PD1 and the second pad PD2, respectively. The protective layer PL may be a single layer film or a stacked film of two or more layers. Examples of the protective layer PL include a silicon oxide film, a silicon oxynitride film, a silicon nitride film, a PSG (Phospho Silicate Glass) film, and a stacked film of these films. A thickness of the protective layer PL is, for example, 0.3 µm or more and 0.7 µm or less.

As shown in FIG. 3, the semiconductor device SD1 according to the first embodiment includes one first resistive element R1 and two first capacitive elements C1. From the viewpoint of easiness of control of the manufacturing process, it is preferable that one first resistive element R1 is formed such that the one first resistive element R1 is sandwiched between two first capacitive elements C1 along the extending direction of the optical waveguide OW in plan view. In addition, from the viewpoint of ease of layout, it is preferable that the first resistive element R1 extends along a direction orthogonal to the optical waveguide OW in plan view.

The layout of the first resistive element R1 and the first capacitive element C1 is not particularly limited. From the viewpoint of area efficiency, it is preferable that the first resistive element R1 extends along the extending direction of the optical waveguide OW in plan view.

[Method of Manufacturing Semiconductor Device SD1]

Subsequently, an exemplary method of manufacturing the semiconductor device SD1 according to the first embodiment will be described. FIGS. 6 to 19 are a cross-sectional views showing exemplary steps included in the method of manufacturing the semiconductor device SD1.

The method of manufacturing the semiconductor device SD1 according to the first embodiment includes, for example, (1) providing a semiconductor wafer SW, (2) forming a part of optical modulator OM, and (3) forming the multilayer wiring layer MWL1 and the heater HT.

(1) Providing of a Semiconductor Wafer SW

Figure 6:
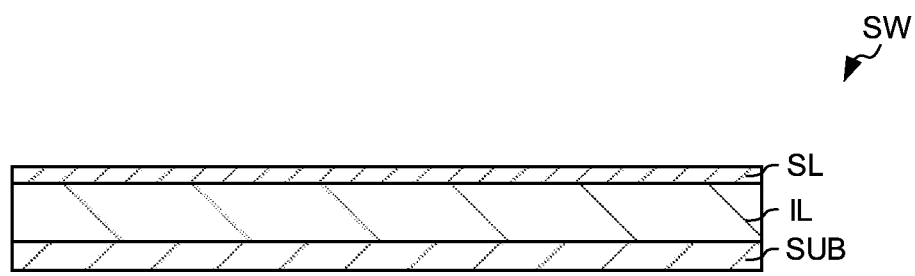
FIG. 6 is a cross-sectional view showing an exemplary step included in a method of manufacturing the semiconductor device according to the first embodiment.

First, as shown in FIG. 6, a semiconductor wafer SW including a substrate SUB, an insulating layer IL formed on the substrate SUB, and a semiconductor layer SL formed on the insulating layer IL is provided.

The semiconductor wafer SW may be manufactured or purchased as a commercial product. The semiconductor wafer SW is, for example, an SOI (Silicon On Insulator) substrate. The method of manufacturing the SOI substrate can be appropriately selected from a known manufacturing method. Example of manufacturing the SOI substrate includes SIMOX (Separation by Implantation of Oxygen) method and smart-cut method. Next, an impurity is implanted into the semiconductor layer SL at a desired impurity concentration by an ion implantation method.

Examples of the substrate SUB and impurity materials are described above. Examples of material for the semiconductor layer SL include silicon and germanium. The crystal structure of the material of the semiconductor layer SL may be single crystal or polycrystalline.

(2) Forming a Part of the Optical Modulator OM

Figure 7:
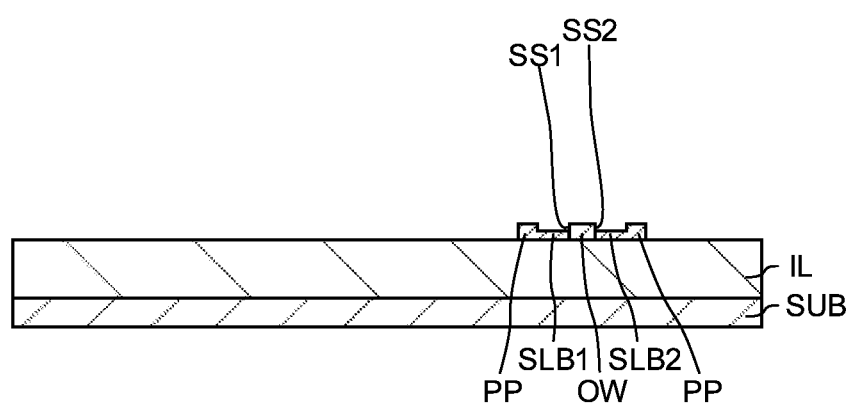
FIG. 7 is a cross-sectional view showing an exemplary step included in the method of manufacturing the semiconductor device according to the first embodiment.

Subsequently, as shown in FIG. 7, the semiconductor layer SL is processed to form a part of optical modulator OM. In the first embodiment, the optical waveguide OW, the first slab portion SLB1, and a second slab portion SLB2 are formed among the optical modulator OM. The optical waveguide OW is formed, for example, by patterning the semiconductor layer SL into a desired shape. Subsequently, the first slab portion SLB1 and second slab portion SLB2 are formed by implanting an impurity into a desired region. The patterning of the semiconductor layer SL can be performed by photolithography method and etching method. The impurity implantation method is, for example, an ion implantation method.

(3) Forming the Multilayer Wiring Layer MWL1 and the Heater

Subsequently, as shown in FIGS. 8 to 19, the multilayer wiring layer MWL1 is formed. Forming the multilayer wiring layer MWL1 includes (3-1) forming the first interlayer insulating layer IIL1, (3-2) forming the first resistive element R1, the metallic layer ML, and the heater HT, (3-3) forming the second interlayer insulating layer IIL2, (3-4) forming the first via V1 and the second via V2, (3-5) forming the first wiring WR1 and the inductor IND, and (3-6) forming the remainder of the multilayer wiring layer MWL1.

Incidentally, FIGS. 8, 10, 12, 14, 16 and 18 are cross-sectional view corresponding to FIG. 4. FIG. 9, FIG. 11, FIG. 13, FIG. 15, FIG. 17, and FIG. 19 are cross-sectional view corresponding to FIG. 5.

(3-1) Forming the First Interlayer Insulating Layer IIL1

Figure 8:
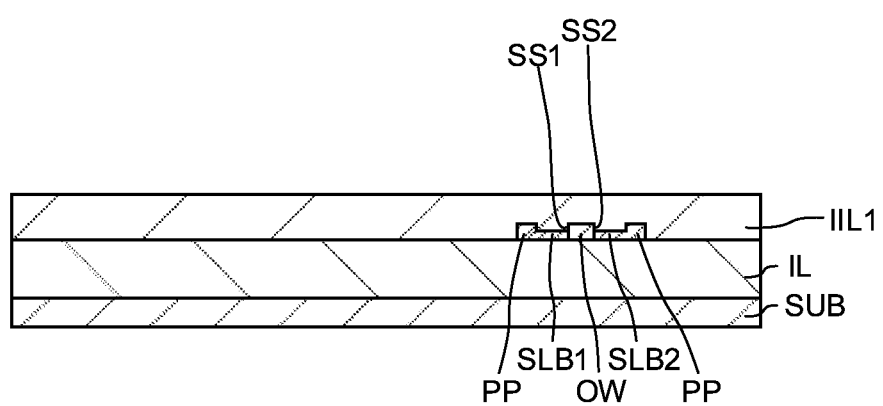
FIG. 8 is a cross-sectional view showing an exemplary step included in the method of manufacturing the semiconductor device according to the first embodiment.
Figure 9:
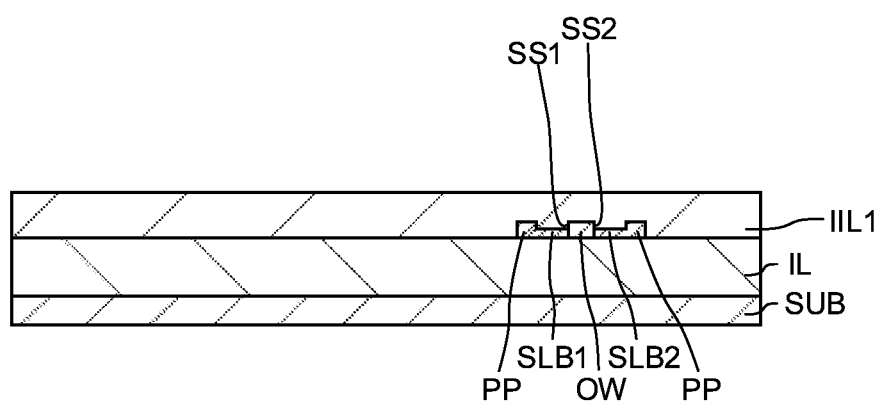
FIG. 9 is a cross-sectional view showing an exemplary step included in the method of manufacturing the semiconductor device according to the first embodiment.

Subsequently, as shown in FIGS. 8 and 9, the first interlayer insulating layer IIL1 is formed on the insulating layer IL so as to cover the optical waveguide OW, the first slab portion SLB1 and the second slab portion SLB 2. The method of forming the first interlayer insulating layer IIL1 is, for example, a CVD method.

Figure 10:
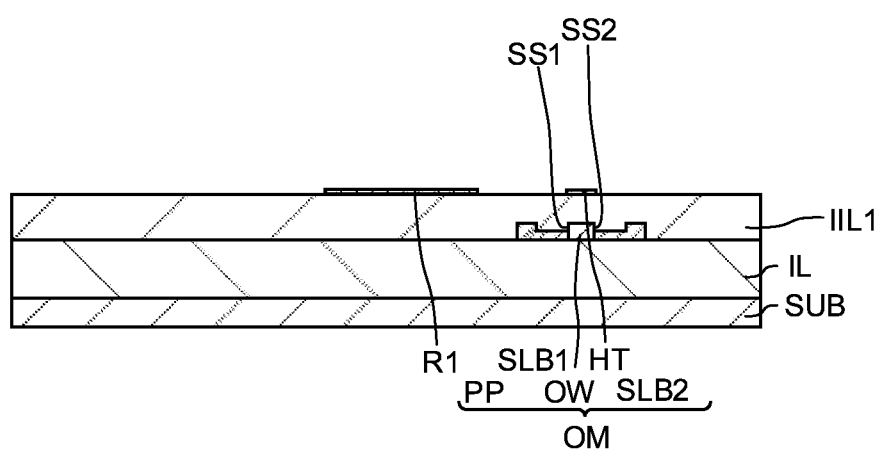
FIG. 10 is a cross-sectional view showing an exemplary step included in the method of manufacturing the semiconductor device according to the first embodiment.
Figure 11:
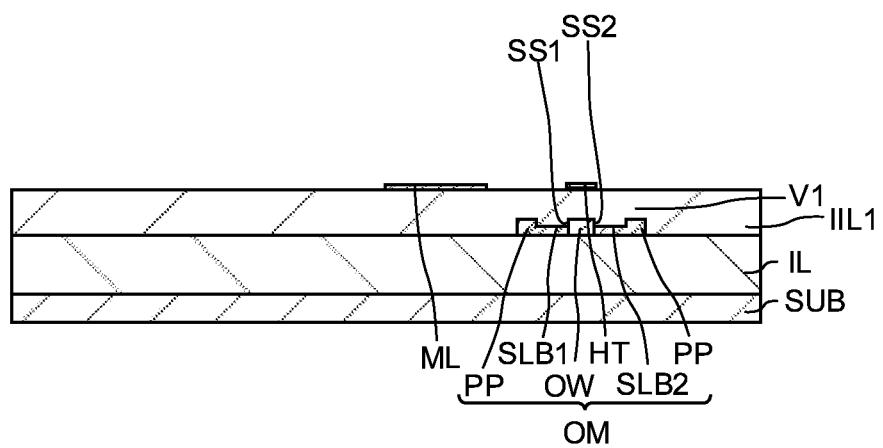
FIG. 11 is a cross-sectional view showing an exemplary step included in the method of manufacturing the semiconductor device according to the first embodiment.

(3-2) Forming the First Resistive Element R1, the Metal Layer ML, and the Heater HT Subsequently, as shown in FIG. 10, the first resistive element R1 and the heater HT are formed on the first interlayer insulating layer IIL1, and as shown in FIG. 11, the metallic layer ML and the heater HT are formed on the first interlayer insulating layer IIL1.

The first resistive element R1 and the metallic layer ML may be formed in a same step or may be formed in different step. In the first embodiment, the first resistive element R1 and the metallic layer ML are formed in a same step. As a result, the number of manufacturing steps can be reduced. For example, after a film composed of materials constituting the first resistive element R1 and the metallic layer ML is formed on the first interlayer insulating layer IIL1, the film is patterned into a desired shape. Thus, the first resistive element R1 and the metal layer ML are formed. The method of forming the film is, for example, a CVD method. The patterning of the film can be performed by photolithography method and etching method.

(3-3) Forming the Second Interlayer Insulating Layer IIL2

Figure 12:
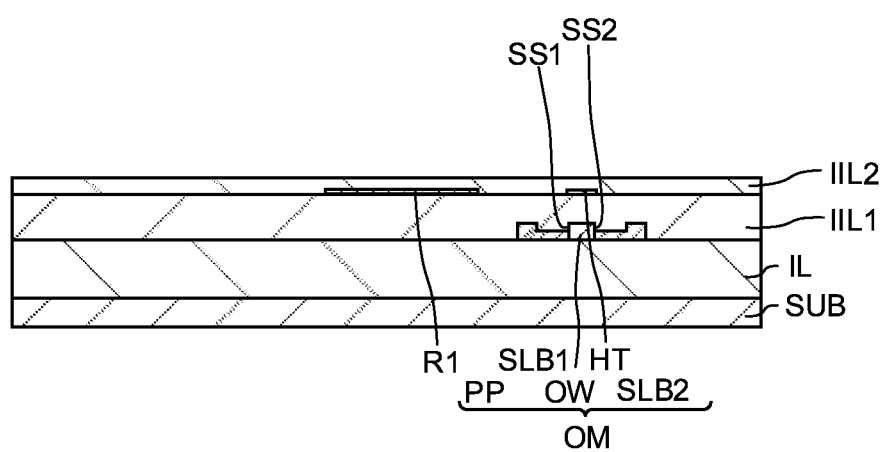
FIG. 12 is a cross-sectional view showing an exemplary step included in the method of manufacturing the semiconductor device according to the first embodiment.
Figure 13:
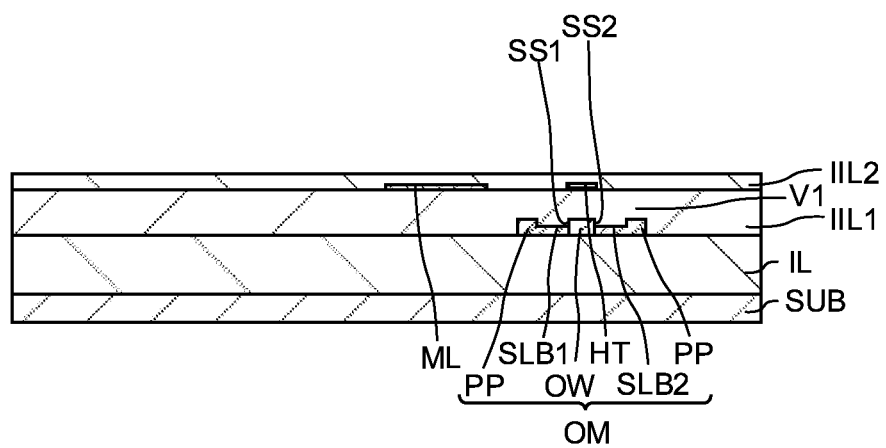
FIG. 13 is a cross-sectional view showing an exemplary step included in the method of manufacturing the semiconductor device according to the first embodiment.

Subsequently, as shown in FIGS. 12 and 13, the second interlayer insulating layer IIL2 is formed on the first interlayer insulating layer IIL1 so as to cover the first resistive elements R1, the metallic layer ML, and the heater HT. The method of forming the second interlayer insulating layer IIL2 is, for example, CVD method.

(3-4) Forming the First Via V1 and the Second Via V2

Figure 14:
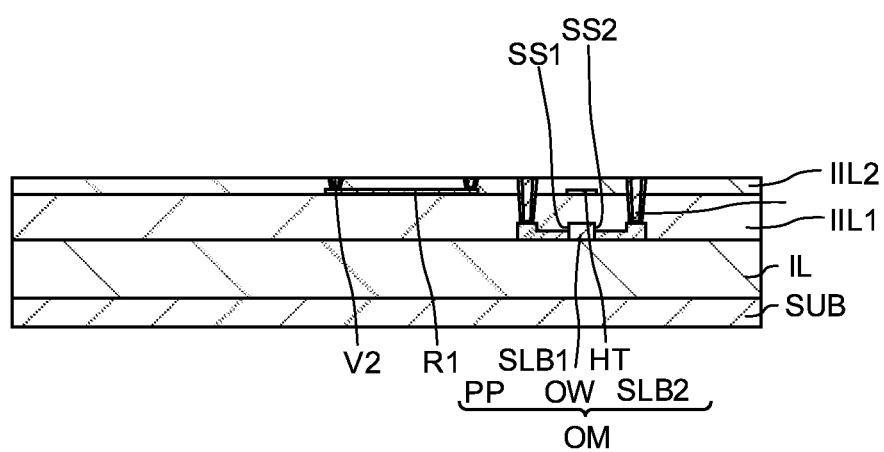
FIG. 14 is a cross-sectional view showing an exemplary step included in the method of manufacturing the semiconductor device according to the first embodiment.
Figure 15:
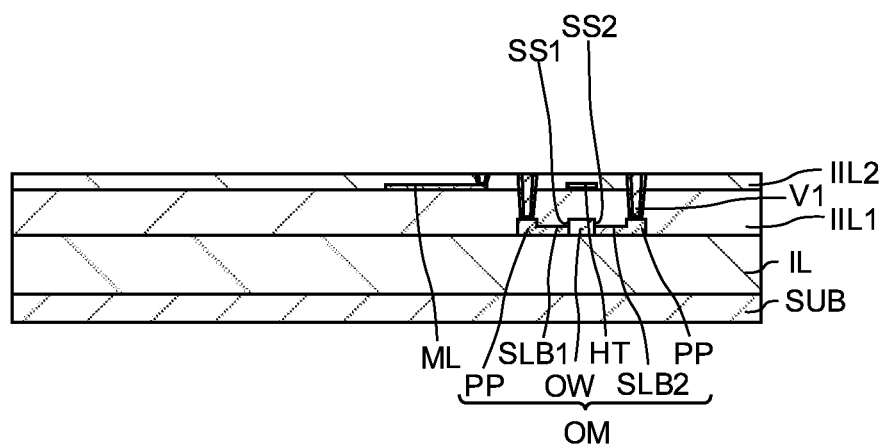
FIG. 15 is a cross-sectional view showing an exemplary step included in the method of manufacturing the semiconductor device according to the first embodiment.

Subsequently, as shown in FIGS. 14 and 15, the first via V1 and the second via V2 are formed. The first via V1 is formed by forming a through hole reaching optical modulator OM in the first interlayer insulating layer IIL1 and the second interlayer insulating layer IIL2, and then burying the through hole with a conductive material. The second via V2 is formed by forming a through hole reaching the first resistive element R1 or the metallic layer ML in the second interlayer insulating layer IIL2, and then burying the through hole with a conductive material. Although not shown in particular, in this step, the second vias V2 reaching the heater HT is also formed. The optical modulator OM includes a protruding portion PP. Thus, when the through hole is formed in this step, damage to the first resistive element R1 and the heater HT due to over-etching can be reduced. As a result, it is possible to suppress the reduction of the characteristics of the semiconductor device SD1.

(3-5) Forming the First Wiring WR1 and the Inductor IND

Figure 16:
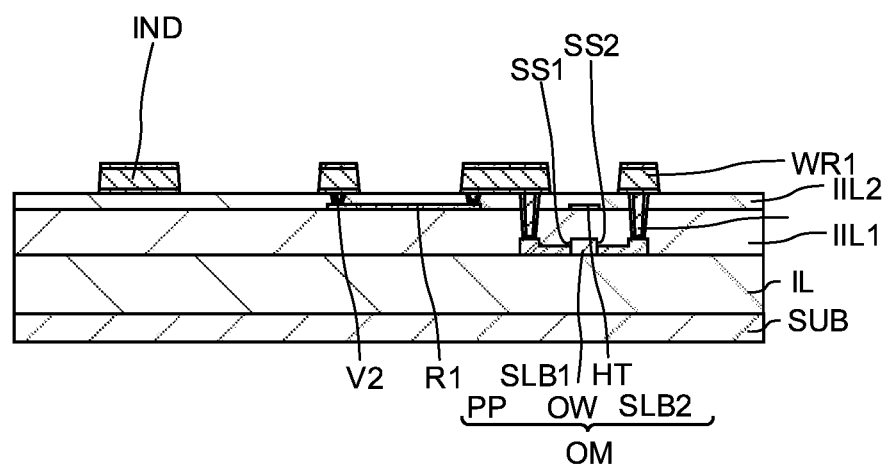
FIG. 16 is a cross-sectional view showing an exemplary step included in the method of manufacturing the semiconductor device according to the first embodiment.
Figure 17:
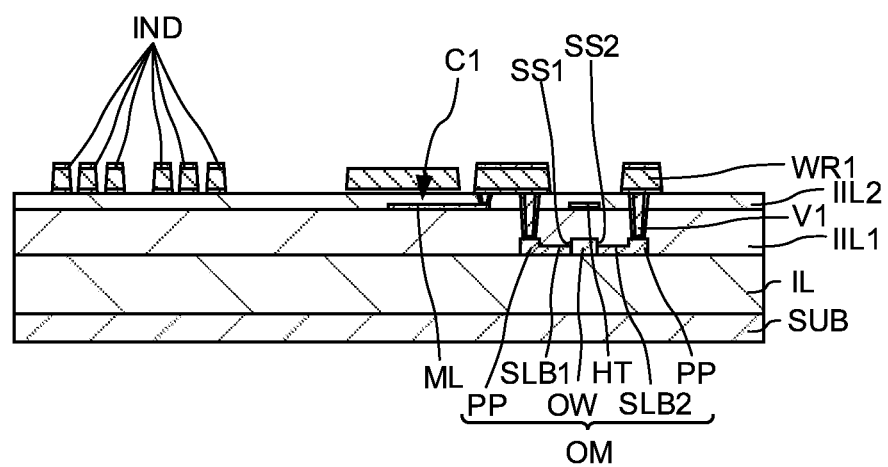
FIG. 17 is a cross-sectional view showing an exemplary step included in the method of manufacturing the semiconductor device according to the first embodiment.

Subsequently, as shown in FIGS. 16 and 17, the first wiring WR1 and the inductor IND are formed on the second interlayer insulating layer IIL2. The first wiring and the inductor WR1 are formed by forming a conductive film on the second interlayer insulating layer IIL2 by a sputtering method and then patterning the conductive film into a desired shape.

(3-6) Forming the Remainder of the Multilayer Wiring Layer MWL1

Figure 18:
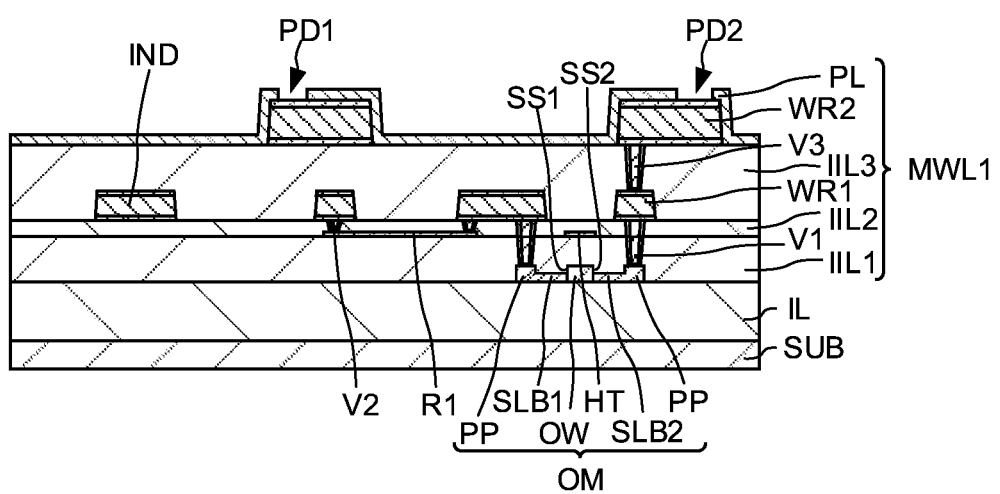
FIG. 18 is a cross-sectional view showing an exemplary step included in the method of manufacturing the semiconductor device according to the first embodiment.
Figure 19:
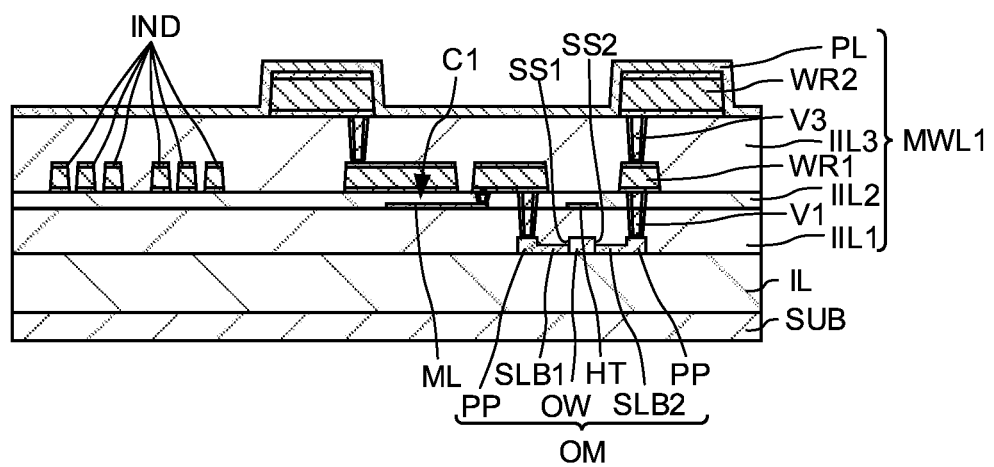
FIG. 19 is a cross-sectional view showing an exemplary step included in the method of manufacturing the semiconductor device according to the first embodiment.

The remainder of the multilayer wiring layer MWL1 is then formed, as shown in FIGS. 18 and 19. In this step, a step of forming the third interlayer insulating layer IIL3, the third via V3, the second wiring WR2, and the protective layer PL is formed in this order. The method of forming the third interlayer insulating layer IIL3 and the protective layer PL is, for example, CVD method. The method of forming the second wiring WR2 is a same as the method of forming the first wiring WR1. The method of forming the third via V3 is a same as the method of forming the first via V1.

Finally, by dicing the structures obtained by the above steps, a plurality of singulated semiconductor devices SD1 are obtained.

(Features of the First Resistive Element R1)

Features of the first resistive element R1 according to the first embodiment will now be described. As representative example of the first resistive element R1 according to the first embodiment, a resistive element composed of titanium nitride (sheet resistance: 37 to 41$\Omega$/$\square$, resistance temperature coefficient: 400 ppm/° C.) will be described. Here, for comparison, a resistive element composed of silicon (hereinafter referred to as a "comparative resistive element") will also be described.

Figure 20:
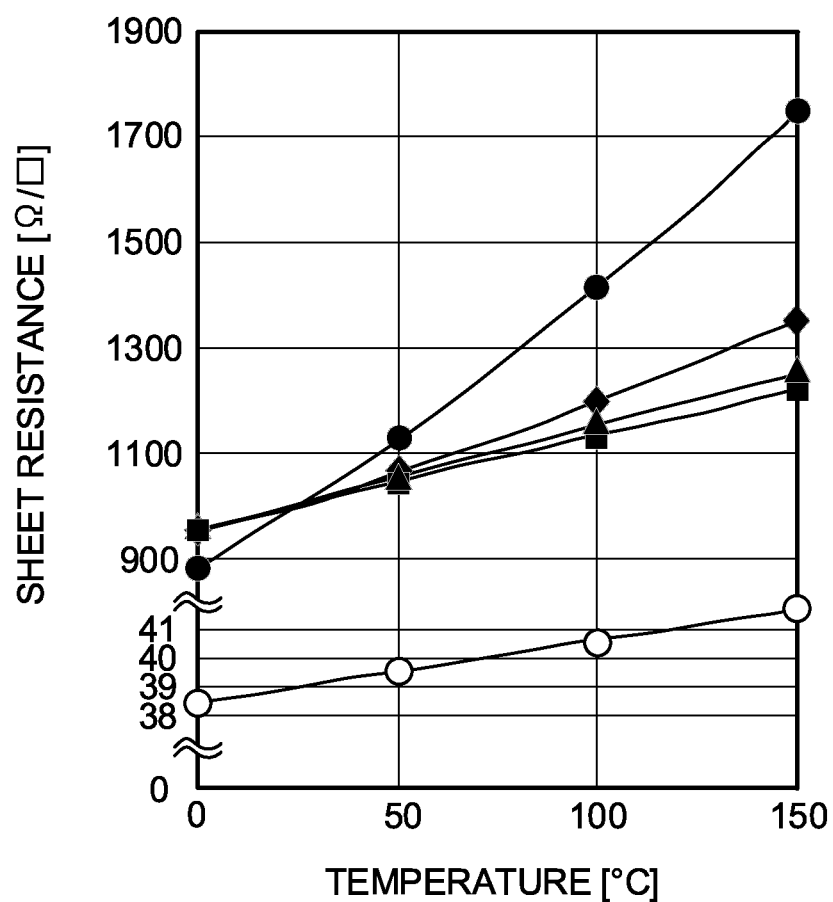
FIG. 20 is a graph showing the relationship (temperature dependence) between the temperature [° C.] of a resistive element and the sheet resistance [$\Omega/\square$] of the resistive element.

FIG. 20 is a graph showing the relationship (temperature dependence) between the temperature [° C.] of the resistive element and the sheet resistance [$\Omega$/$\square$] of the resistive element. In FIG. 20, a white circle (○) indicates the temperature-dependence of the first resistive element R1 according to the first embodiment. A black circle (●) indicates the thermal dependence of the comparative resistive element when an impurity concentration is $1 \times 10^{17}$ [cm-3]. A black diamond (◆) indicates the thermal dependence of the comparative resistive element when an impurity concentration is $1 \times 10^{18}$ [cm-3]. A black square (■) indicates the thermal dependence of the comparative resistive element when an impurity concentration is $1 \times 10^{19}$ [cm-3]. A black triangle (▲) indicates the thermal dependence of the comparative resistive element when an impurity concentration is $1 \times 10^{20}$ [cm-3].

As shown in FIG. 20, the temperature dependence of the comparative resistive element is greater than the temperature dependence of the first resistive element R1 according to the first embodiment. The smaller the impurity concentration, the greater temperature-dependent the temperature tends to be. For example, when the impurity concentration is $1 \times 10^{20}$ [cm-3], the sheet resistance of the comparative resistive element increases from about 900 [$\Omega$/$\square$] to about 1100 [$\Omega$/$\square$] when the temperature is from 0° C. to 100° C. On the other hand, when the impurity concentration is $1 \times 10^{17}$ [cm-3], the sheet resistance of the comparative resistive element increases from about 950 [$\Omega$/$\square$] to about 1450 [$\Omega$/$\square$] when the temperature is from 0° C. to 100° C. This means that the resistance value of the comparative resistive element varies greatly with a temperature change. This phenomenon becomes more pronounced as impurity concentration is smaller.

Here, as described above, when the frequency of electrical signal treated by the semiconductor device SD1 is 100 GHz or more, the resistance value of the resistive element is preferably 85 k$\Omega$ or more. In order to realize such higher resistance values by the comparative resistance element, the impurity concentration needs to be reduced. However, as described above, as the impurity concentration of the comparative resistive element decreases, the temperature-dependence of the comparative resistive element increases. Therefore, the comparative resistive element cannot achieve both a high resistance value and a low temperature dependence. In other words, a semiconductor device including the comparative resistive element is incompatible with the treating of the high-frequency signals and the stabilization of the resistance values of the resistive element.

On the other hand, the sheet resistance of the first resistive element R1 is smaller than the sheet resistance (900 to 1800$\Omega$/$\square$) of the comparative resistive element. As shown in FIG. 20, the temperature dependence of the first resistive element R1 is smaller than the temperature dependence of the comparative resistive element. For example, even when the temperature changes from 0° C. to 100° C., the sheet resistance of the first resistive element R1 increases by only about 2 [$\Omega$/$\square$]. As described above, the first resistive element R1 can achieve both a high resistance value and a low temperature dependence. That is, semiconductor device SD1 including the first resistive element R1 can both treating high-frequency signals and stabilizing the resistance value of the resistive element.

(Features of the Capacitive Element C1)

Next, features of the capacitive element C1 according to the first embodiment will be described. Here, for comparison, a capacitive element (hereinafter referred to as a "comparative capacitive element") composed of a portion of the first wiring WR1, a portion of the third interlayer insulating layer IIL3, and a portion of the second wiring WR2 will also be described.

Figure 21:
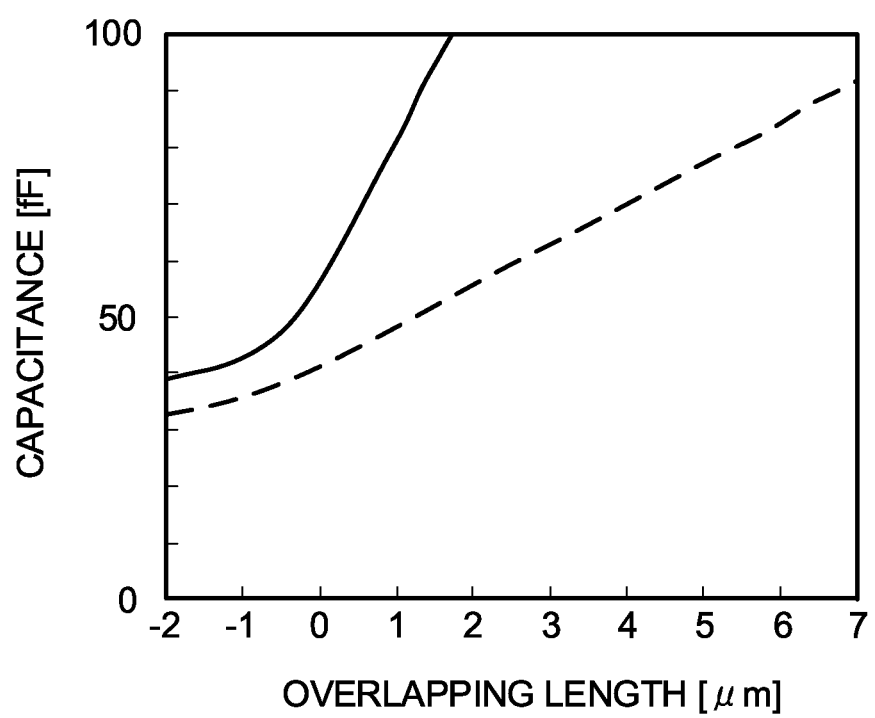
FIG. 21 is a graph showing the relationship between the overlap length [μm] of a lower electrode of a capacitive element and an upper electrode of the capacitive element, and the capacitance value [fF] of the capacitive element.

Here, the relationship between the overlap length [μm] of the lower electrode of the capacitive element and the upper electrode of the capacitive element and the capacitance value [fF] of the capacitive element was simulated. FIG. 21 is a graph showing the relationship between the overlap length [μm] of the lower electrode of the capacitive element and the upper electrode of the capacitive element and the capacitance value [fF] of the capacitive element. In FIG. 21, a solid line indicates the simulated result of the capacitive element C1 according to the first embodiment. A broken line indicates the simulation result of the comparative capacitive element.

In the present simulations, the distance between the lower electrode and the upper electrode of the capacitive element C1 according to the first embodiment was set to 0.3 μm. The distance between the lower electrode and the upper electrode in the comparative capacitive element was set to 1.0 μm. The overlap length is an overlap length of the lower electrode and the upper electrode in plan view. When the value of the overlap length is positive, the lower electrode and the upper electrode overlap each other in plan view. The capacitive element C1 according to the first embodiment has an overlap length between the metallic layer ML (lower electrode) and the first wiring WR1 (upper electrode). The comparative capacitance device has an overlap length of the first wiring (lower electrode) and the second wiring (upper electrode).

As shown in FIG. 21, compared with the capacitance value of the capacitive element, the capacitance value of the capacitive element C1 according to the first embodiment has a greater increasing rate with respect to the overlap length. In the comparative capacitive element, the first wiring WR1 and the second wiring WR2 need to be separated from each other by a certain distance from the viewpoint of suppressing a short circuit between the first wiring WR WR1 and second wiring WR2. On the other hand, the lower electrode of capacitive element C1 according to the first embodiment is metallic layer ML thinner than the first wiring layer WR1. To this end, the metallic layer ML and the first wiring WR1 may be arranged close to each other. Therefore, even if the planar area of capacitive element C1 according to the first embodiment is small, a same level of capacitance value as the comparative capacitive element can be obtained. For example, since the capacitance value is 100 [fF], an overlap length of 7 μm or more is required for the comparative capacitance element. On the other hand, capacitive element C1 according to the first embodiment may have an overlap length of about 1.5 μm. As described above, in first embodiment, the semiconductor device SD1 can be miniaturized.

The capacitive element C1 according to the first embodiment includes the metallic layer ML as a lower electrode, the metallic layer ML having a thickness smaller than the thickness of the first wiring layer WR1. Therefore, the effect of a fringing electric field can be reduced as compared with the case where a thicker first wiring electrode WR1 is used as the lower electrode. That is, in the capacitive element C1 according to the first embodiment, the electric field (fringe electric field) formed between a side surface of the metallic layer ML (lower electrode) and a lower surface of the first wiring WR1 is smaller than the electric field (fringe electric field) formed between a side surface of the first wiring WR1 and the lower surface of the second wiring WR2 in the comparative capacitive element. As a result, it is possible to reduce variation in the capacitance value caused by the fringe electric field. As a result, the reliability of the semiconductor device SD1 can be improved.

In the semiconductor device SD1 according to the first embodiment, the material of the first resistive element R1 is at least one material selected from the group consisting of titanium, titanium nitride, tantalum, tantalum nitride, tungsten, and silicon chromium. The first resistive element R1 composed of these materials has one or both of a sheet resistance smaller than the sheet resistance (900 to 1800Ω/□) of the resistive element composed of silicon and a resistance temperature coefficient smaller than the resistance temperature coefficient (2100 to 5600 ppm/° C.) of the resistive element composed of silicon. Therefore, as compared with a resistance element composed of silicon, a high resistance value and a low temperature dependence can be compatible with each other. As a result, according to the first embodiment, the characteristics of the semiconductor device SD1 can be improved.

The first resistive element R1 is formed in a same step as the step of forming the metal layer ML of the capacitive element C1 and the step of forming the heater HT. As a result, according to the first embodiment, method of manufacturing the semiconductor device SD1 can be simplified.

Second Embodiment

In a semiconductor device SD2 according to a second embodiment, the first resistive element R1 and the first capacitive element C1 constituting the equalizer circuit EQC2 are integrally formed as single member.

Only the configuration of the semiconductor device SD2 differs from that of the optoelectronic hybrid device LE1 according to the first embodiment in the optoelectronic hybrid device LE 2 according to the second embodiment. The semiconductor device SD2 according to the second embodiment differs from the semiconductor device SD1 according to the first embodiment in the configuration of the equalizer circuit EQC2. Therefore, the same constituent elements as those of the semiconductor device SD1 according to the first embodiment are denoted by the same reference numerals, and descriptions thereof are omitted.

(Circuit Configuration of Optoelectronic Hybrid Device)

FIG. 1 is a block diagram showing an exemplary configuration of an optoelectronic hybrid device LE2 according to a second embodiment. FIG. 2 is a circuit diagram showing an exemplary circuit configuration of a main portion of the optoelectronic hybrid device LE2.

As shown in FIG. 1, the optoelectronic hybrid device LE2 includes a first electronic circuit EC1, a light source LS, a IC chip CP, and a semiconductor device SD2. The semiconductor device SD2 includes a optical waveguide OW, a wave adjusting part WA2, an optical modulator OM, a light output part LO, a light input part LI, and an optical receiver OR.

The waveform adjusting part WA2 adjusts the waveform of electrical signal received from the second electronic circuit EC2, and outputs electrical signal toward the optical modulator OM. In the second embodiment, the waveform adjusting part WA2 includes an inductor IND and an equalizer circuit EQC2.

(Configuration of Semiconductor Device)

Figure 22:
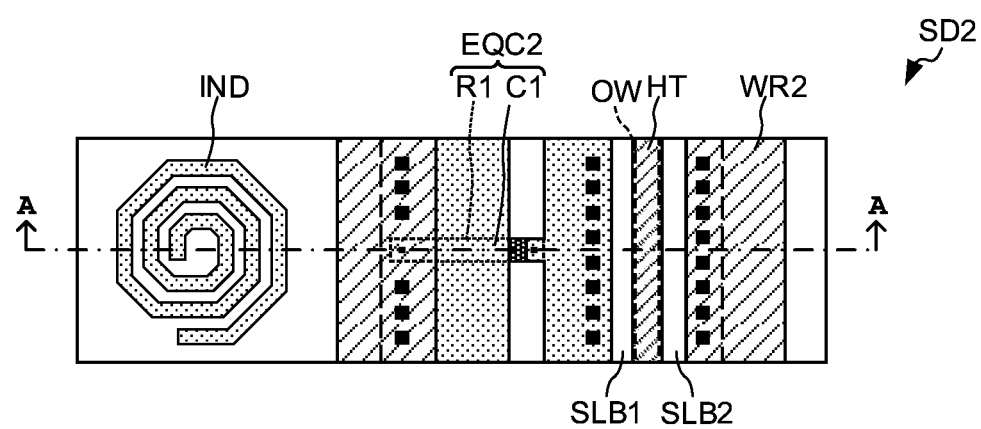
FIG. 22 is a plan view showing an exemplary configuration of a main portion of a semiconductor device according to a second embodiment.
Figure 23:
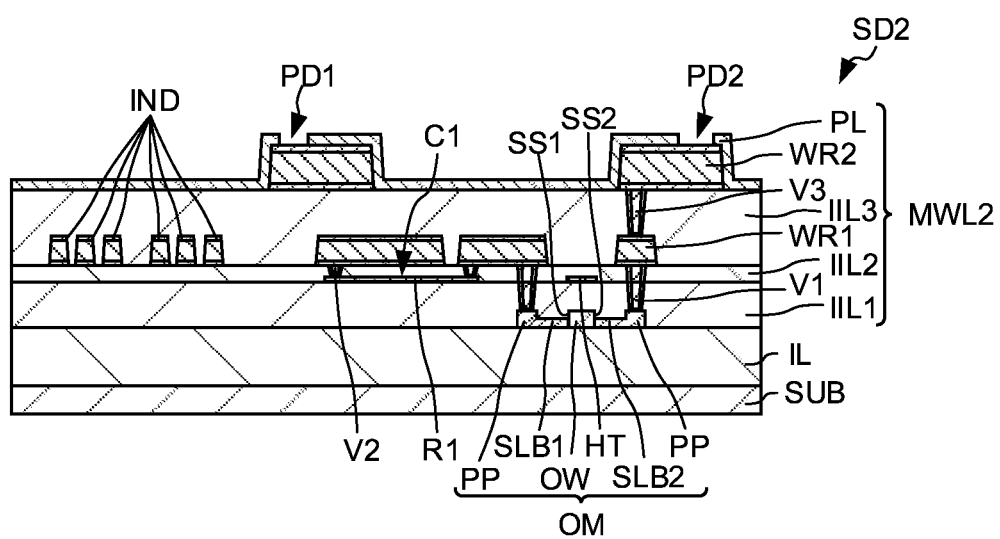
FIG. 23 is a cross-sectional view showing an exemplary configuration of a main portion of the semiconductor device according to the second embodiment.

Next, the configuration of the semiconductor device SD2 according to the embodiment will be described. FIG. 22 is a plan view showing an exemplary configuration of a main portion of a semiconductor device SD2. FIG. 23 is a cross-sectional view showing an exemplary configuration of the main portion of the semiconductor device SD2. FIG. 23 is a cross-sectional view taken along line A-A of FIG. 22.

The semiconductor device SD2 includes a substrate SUB, an insulating layer IL, an optical modulator OM and a multilayer wiring layer MWL2. The multilayer wiring layer MWL2 includes a first interlayer insulating layer IIL1, a first resistive element R1, a second interlayer insulating layer IIL2, a first via V1, a second via V2, a first wiring WR1, an inductor IND, a third interlayer insulating layer IIL3, a third via V3, a second wiring WR2, and a protective layer PL.

The multilayer wiring layer MWL2 is formed on the insulating layer IL such that the multilayer wiring layer MWL2 covers the optical modulator OM. The first resistive element R1, a portion of the second interlayer insulating layer IIL2, and a portion of the first wiring WR1 constitute a first capacitive element C1. In the second embodiment, the first resistive element R1 is also the lower electrode of the first capacitive element C1. The first resistive element R1 and the first capacitive element C1 constitute an equalizer circuit EQC2.

An end portion of the first resistive element R1 is electrically connected with the optical modulator OM. Another end portion of the first resistive element R1 is electrically connected with the first wiring WR1. In the second embodiment, the first resistive element R1 is also the lower electrode of the first capacitive element C1. Therefore, the first resistive element R1 is connected between the upper electrode (a portion of the first wiring WR1) of the first capacitive element C1 and the optical modulator OM.

The first wiring WR1 is formed on the second interlayer insulating layer IIL2. A portion of the first wiring WR1 is an upper electrode of the first capacitive element C1. As shown in FIG. 22, the portion of the first wiring WR1 is formed such that the portion of the first wiring WR1 overlaps with a portion of the first resistive element R1 in plan view.

[Method of Manufacturing Semiconductor Device SD2]

A method of manufacturing of semiconductor device SD2 according to a second embodiment is the same as that of the semiconductor device SD1 according to the first embodiment except that the portion of the first wiring WR1 constituting the first capacitive element C1 is formed to overlap with the first resistive element R1.

The semiconductor device SD2 according to the second embodiment has the same effects as the semiconductor device SD1 according to the first embodiment. The first capacitive element C1 of semiconductor device SD2 includes the first resistive element R1, a portion of the second interlayer insulating layer IIL2, and a portion of the first wiring WR1. Therefore, the semiconductor device SD2 can be further miniaturized.

[First Modification]

Figure 24:
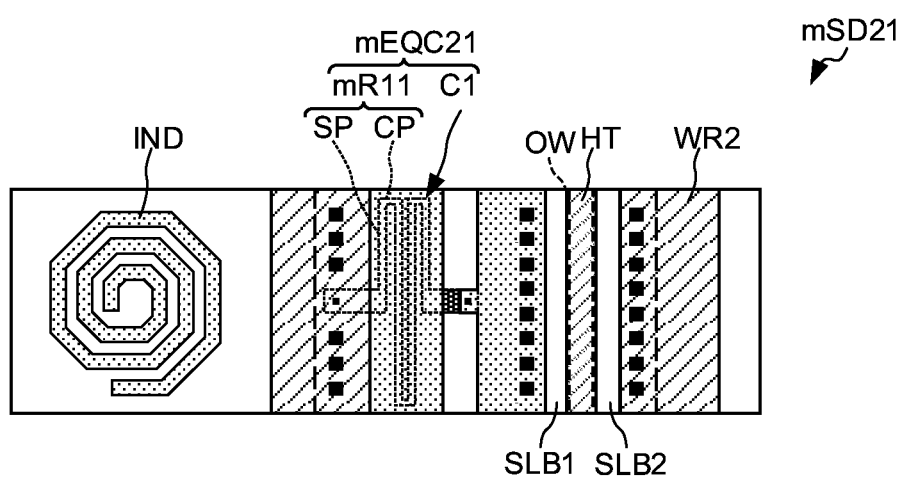
FIG. 24 is a plan view showing an exemplary configuration of a main portion of a semiconductor device according to a first modification of the second embodiment.

FIG. 24 is a plan view showing an exemplary configuration of a main portion of a semiconductor device mSD21 according to a first modification of the second embodiment. A first resistive element mR11 of semiconductor the semiconductor device mSD21 includes a plurality of straight portions SP and a plurality of connecting portions CP. In the first modification, as shown in FIG. 24, a planar shape of the first resistive element mR11 in plan view is a corrugated shape (waveform shape).

The plurality of straight portions SP are arranged in parallel with each other. In the first modification, the straight portion SP extends along the optical waveguide OW in plan view. The number, length, and width of the straight portion SP can be appropriately adjusted in accordance with desired resistance value of the first resistive element mR11. In the first modification, the number of straight portions SP is four. In the extending direction of the optical waveguide OW, the length of each of the plurality of straight portions SP may be a same or different from each other. In the first modification, in plan view, the lengths of the two straight portions SP located inside among the four straight portions SP are longer than the lengths of the two straight portions SP located outside among the four straight portions SP. The widths of the plurality of straight portions SP may be a same or different from each other. In the first modification, the widths of each of the four straight portions SP are the same with each other.

The plurality of connecting portions CP respectively connect two straight portions SP adjacent to each other among the plurality of straight portions SP. The connecting portion CP connect end portions of the two straight portions SP adjacent to each other. The number, length, and width of the plurality of connecting portions CP can be appropriately adjusted in accordance with desired resistance values of the first resistive element mR11. The number, length, and width of the plurality of connecting portions CP are determined in accordance with the number, position, and position of the plurality of straight portions SP. In the first modification, the number of connecting portions CP is three. When viewed from above (in plan view), in a direction perpendicular to the extending direction of the optical waveguide OW, the lengths of the plurality of connecting portions CP may be a same or different from each other. In the first modification, in plan view, the above-mentioned length of each of the three straight portions SP is the same with each other. The widths of the plurality of connecting portions CP may be a same or different from each other. In the first modification, the widths of each of the three connecting portions CP are the same with each other.

In the first modification, as shown in FIG. 24, the first wiring WR1 overlaps with an entire of the plurality of straight portions SP and an entire of the plurality of connecting portions CP in plan view. As a result, the capacitance value of the first capacitive element C1 can be increased.

[Second Modification]

Figure 25:
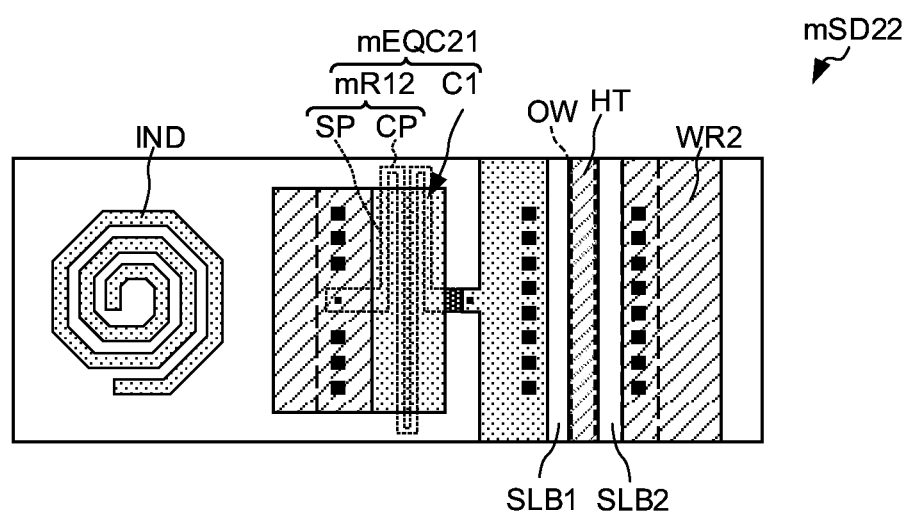
FIG. 25 is a plan view showing an exemplary configuration of a main portion of a semiconductor device according to a second modification of the second embodiment.

FIG. 25 is a plan view showing an exemplary configuration of a main portion of a semiconductor device mSD22 according to a second modification of the second embodiment. A first resistive element mR12 of the semiconductor device mSD22 include a plurality of straight portions SP and a plurality of connecting portions CP. In second modification, as shown in FIG. 25, the first wiring WR1 overlaps with a portion of the first resistive element mR12 without overlapping with another portion of the first resistive element mR12 along the extending direction of the plurality of straight portions SPs in plan view. In second modification, the first wiring element WR1 overlaps with the remainder of the first resistive element mR12 without overlapping with the other portion of the first resistive element mR12 along the extending direction of the plurality of straight portions SPs in plan view. By adjusting the overlapping area of the first wiring WR1 and the first resistive element mR12 in plan view, a capacitance value of the first capacitive element C1 can be arbitrarily adjusted. In addition, by adjusting a length of the first resistive element mR12, a resistance value of the first resistive element mR12 can be arbitrarily adjusted. Thus, second modification allows greater flexibility in designing the semiconductor device mSD22.

[Third Modification]

Figure 26:
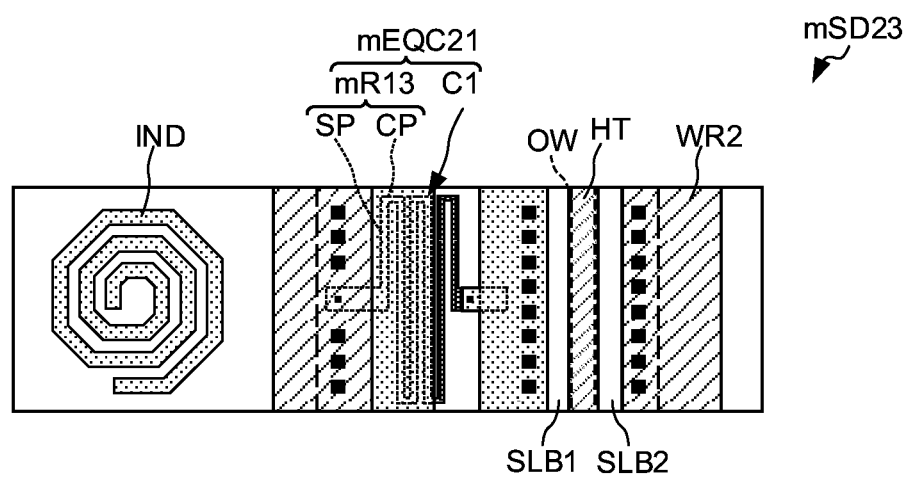
FIG. 26 is a plan view showing an exemplary configuration of a main portion of a semiconductor device according to a third modification of the second embodiment.

FIG. 26 is a plan view showing an exemplary configuration of a main portion in of a semiconductor device mSD23 according to a third modification of the second embodiment. A first resistive element mR13 of semiconductor device mSD23 includes a plurality of straight portions SP and a plurality of connecting portions CP. In the third modification, as shown in FIG. 26, the first wiring WR1 overlaps with a portion of the first resistive element mR13 without overlapping with another portion of the first resistive element mR13 along an arrangement direction of the plurality of straight portions SP in plan view. In the third modification, the first wiring WR1 overlaps with the remainder of the first resistive element mR13 without overlapping with the other portion of the first resistive element mR13 along the arrangement directions of the plurality of straight portions SP in plan view. The semiconductor device mSD23 according to the third modification has the same effects as the semiconductor device mSD22 according to the second modification.

[Fourth Modification]

Figure 27:
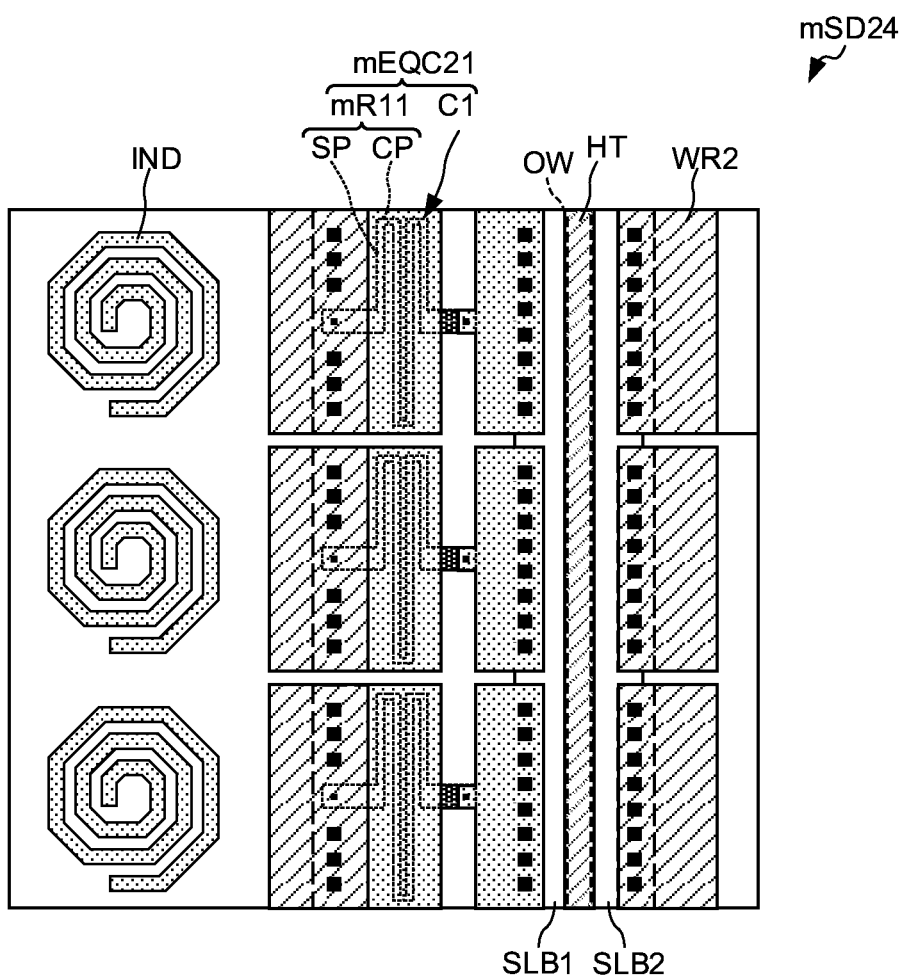
FIG. 27 is a plan view showing an exemplary configuration of a main portion of a semiconductor device according to a fourth modification of the second embodiment.

FIG. 27 is a plan view showing an exemplary configuration of a main portion of a semiconductor device mSD24 according to a fourth modification of the second embodiment. The semiconductor device mSD24 includes a plurality of equalizer circuits mEQC21. The plurality of equalizer circuits mEQC21 are arranged along the optical modulator OM. The number of equalizer circuits mEQC21 can be appropriately adjusted in accordance with the desired characteristics of the semiconductor device mSD24. In the fourth modification, the number of equalizer circuits mEQC21 is three. Since the equalizer circuit mEQC21 is miniaturized, the semiconductor device mSD24 can include a plurality of equalizer circuits mEQC21. In the fourth modification, an electrical signal can be corrected more effectively. As a result, the characteristics of semiconductor device mSD24 can be further improved.

It should be noted that the present invention is not limited to the above-mentioned embodiments, and various modifications can be made without departing from the gist thereof. For example, the semiconductor device SD1, SD2 according to the first and second embodiments may not include the heater HT.

The multilayer wiring layer MWL1, MWL2 may further include another layer between the layers. An example of the other layer is, for example, a silicon nitride film. The wiring of multilayer wiring layer MWL1 and MWL2 may have a so-called damascene configuration. Furthermore, the optical waveguide OW may have a size of the order of micrometers.

In the first and second embodiments, the upper electrode of the first capacitive element C1 is a portion of the first wiring layer WR1, but the upper electrode of the first capacitive element C1 may be the first resistive element R1 or the metallic layer ML.

The first resistive element R1 may be formed directly on insulating layer IL.

In the first and second embodiments, semiconductor devices including the optical modulator OM has been described. However, the semiconductor device may be any semiconductor device for treating an analogue signal, and is not limited to semiconductor device to which the silicon photonics technique is applied.

In addition, at least a part of the first and second embodiments and at least a part of first, second, third and fourth modifications may be arbitrarily combined with each other. For example, the semiconductor device may include a plurality of equalizer circuits EQC1 instead of a plurality of equalizer circuits EQC2. The semiconductor device may have both the equalizer circuit EQC1 and the equalizer circuit EQC2.

In addition, even when a specific numerical value example is described, it may be a numerical value exceeding the specific numerical value, or may be a numerical value less than the specific numerical value, except when it is theoretically obviously limited to the numerical value. In addition, the component means "B containing A as a main component" or the like, and the mode containing other components is not excluded.

What is claimed is:

1. A semiconductor device comprising:
   a first insulating layer;
   an optical modulator formed on the first insulating layer; and
   a multilayer wiring layer formed on the first insulating layer such that the multilayer wiring layer covers the optical modulator, the multilayer wiring layer comprising a wiring and a resistive element which are spaced apart from each other,
   wherein, in plan view, the resistive element is formed without overlapping with the optical modulator,
   wherein a material of the resistive element is at least one selected from the group consisting of titanium, titanium nitride, tantalum, tantalum nitride, tungsten, and silicon chromium,
   wherein the multilayer wiring layer comprises:
      a metallic layer; and
      a second insulating layer formed between the metallic layer and the wiring,
   wherein a material of the metallic layer is at least one selected from the group consisting of titanium, titanium nitride, tantalum, tantalum nitride, tungsten, and silicon chromium,
   wherein the metallic layer, the second insulating layer and the wiring constitute a capacitive element,
   wherein an end portion of the resistive element is electrically connected with the optical modulator and the metallic layer, and
   wherein another end portion of the resistive element is electrically connected with the wiring.

2. The semiconductor device according to claim 1, wherein the material of the resistive element is a same as the material of the metallic layer.

3. The semiconductor device according to claim 2, wherein the multilayer wiring layer comprises an inductor electrically connected with the resistive element.

4. The semiconductor device according to claim 3, wherein the resistive element comprises:
   a plurality of straight portions arranged in parallel with each other; and
   a plurality of connecting portions, the connecting portion connecting end portions of two straight portions adjacent to each other among the plurality of straight portions, and wherein a planar shape of the resistive element is a corrugated shape.

5. The semiconductor device according to claim 4, wherein, in plan view, the wiring overlaps with an entire of the plurality of straight portions and an entire of the plurality of connecting portions.

6. The semiconductor device according to claim 4, wherein, in plan view, the wiring overlaps with a portion of the resistive element without overlapping with another portion of the resistive element along an extension direction of the straight portion.

7. The semiconductor device according to claim 4, wherein, in plan view, the wiring overlaps with a portion of the resistive element without overlapping with another portion of the resistive element in an arrangement direction of the plurality of straight portions.

8. The semiconductor device according to claim 3,
   wherein the multilayer wiring layer comprises a heater formed in a same layer as a layer in which the resistive element and the metallic layer are formed, and
   wherein, in plan view, the heater overlaps with the optical waveguide.

9. The semiconductor device according to claim 3, wherein the optical modulator is configured to operate based on an electrical signal having a frequency of 100 GHz or more.

10. The semiconductor device according to claim 1, wherein the material of the resistive element is at least one selected from the group consisting of titanium nitride, tantalum nitride, tungsten, and silicon chromium.

11. A semiconductor device comprising:
    a first insulating layer;
    an optical modulator formed on the first insulating layer; and
    a multilayer wiring layer formed on the first insulating layer such that the multilayer wiring layer covers the optical modulator, the multilayer wiring layer comprising a wiring and a resistive element which are spaced apart from each other,
    wherein, in plan view, the resistive element is formed without overlapping with the optical modulator,
    wherein a material of the resistive element is at least one selected from the group consisting of titanium, titanium nitride, tantalum, tantalum nitride, tungsten, and silicon chromium,
    wherein the multilayer wiring layer comprises a second insulating layer formed between the resistive element and the wiring,
    wherein the resistive element, the second insulating layer and the wiring constitute a capacitive element,
    wherein an end portion of the resistive element is electrically connected with the optical modulator, and
    wherein another end portion of the resistive element is electrically connected with the wiring.

12. The semiconductor device according to claim 11, wherein the multilayer wiring layer comprises an inductor electrically connected with the resistive element.

13. The semiconductor device according to claim 12, wherein the optical modulator is configured to operate based on an electrical signal having a frequency of 100 GHz or more.

14. The semiconductor device according to claim 12, wherein the material of the resistive element is at least one selected from the group consisting of titanium nitride, tantalum nitride, tungsten, and silicon chromium.

15. The semiconductor device according to claim 11, wherein the resistive element comprises:
   a plurality of straight portions arranged in parallel with each other; and
   a plurality of connecting portions, the connecting portion connecting end portions of two straight portions adjacent to each other among the plurality of straight portions, and wherein a planar shape of the resistive element is a corrugated shape.

16. The semiconductor device according to claim 15, wherein, in plan view, the wiring overlaps with an entire of the plurality of straight portions and an entire of the plurality of connecting portions.

17. The semiconductor device according to claim 15, wherein, in plan view, the wiring overlaps with a portion of the resistive element without overlapping with another portion of the resistive element along an extension direction of the straight portion.

18. The semiconductor device according to claim 15, wherein, in plan view, the wiring overlaps with a portion of the resistive element without overlapping with another portion of the resistive element in an arrangement direction of the plurality of straight portions.

19. The semiconductor device according to claim 11,
   wherein the multilayer wiring layer comprises a heater formed in a same layer as a layer in which the resistive element is formed, and
   wherein, in plan view, the heater overlaps with the optical waveguide.

* * * * *